United States Patent
Ishida et al.

(10) Patent No.: US 9,088,015 B2
(45) Date of Patent: Jul. 21, 2015

(54) FUEL CELL COMPRISING WATER DISCHARGE CHANNEL FORMED BY A CORRUGATED SECTION

(71) Applicant: Honda Motor Co., Ltd., Tokyo (JP)

(72) Inventors: Kentaro Ishida, Tochigi (JP); Shuhei Goto, Tochigi (JP); Seiji Sugiura, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 13/800,625

(22) Filed: Mar. 13, 2013

(65) Prior Publication Data

US 2013/0252130 A1 Sep. 26, 2013

(51) Int. Cl.
- *H01M 8/02* (2006.01)
- *H01M 8/04* (2006.01)
- *H01M 8/10* (2006.01)

(52) U.S. Cl.
CPC ........ *H01M 8/04007* (2013.01); *H01M 8/0267* (2013.01); *H01M 8/04156* (2013.01); *H01M 8/0206* (2013.01); *H01M 2008/1095* (2013.01); *Y02E 60/50* (2013.01)

(58) Field of Classification Search
CPC .......... H01M 8/04007; H01M 8/0206; H01M 8/0267; H01M 8/04156; H01M 2008/1095
USPC .......... 429/482, 457, 410, 434, 480, 483, 428
See application file for complete search history.

(56) References Cited

U.S. PATENT DOCUMENTS

| | | | |
|---|---|---|---|
| 6,248,466 B1 * | 6/2001 | Takahashi et al. | 429/434 |
| 2008/0299439 A1 * | 12/2008 | Wang | 429/34 |
| 2009/0042075 A1 * | 2/2009 | Nakanishi et al. | 429/26 |
| 2010/0248043 A1 * | 9/2010 | Turner et al. | 429/410 |
| 2010/0310957 A1 * | 12/2010 | Sugiura et al. | 429/434 |

FOREIGN PATENT DOCUMENTS

| | | |
|---|---|---|
| JP | 3123992 | 1/2001 |
| JP | 2011-171222 | 9/2011 |

\* cited by examiner

*Primary Examiner* — Kenneth Douyette
(74) *Attorney, Agent, or Firm* — Nelson Mullins Riley & Scarborough LLP; Anthony A. Laurentano

(57) ABSTRACT

A power generation unit of a fuel cell includes a first metal separator, a first membrane electrode assembly, a second metal separator, a second membrane electrode assembly, and a third metal separator. A bypass limiting section is provided at an end of the coolant flow field for preventing a coolant from bypassing the coolant flow field. The bypass limiting section includes a corrugated section formed integrally with the first metal separator and a corrugated section formed integrally with the third metal separator adjacent to the first metal separator, and contacting the corrugated section.

5 Claims, 25 Drawing Sheets

FUEL CELL COMPRISING WATER DISCHARGE CHANNEL FORMED BY A CORRUGATED SECTION

CROSS-REFERENCE TO RELATED APPLICATIONS

This application is based upon and claims the benefit of priority from Japanese Patent Applications No. 2012-070079 filed on Mar. 26, 2012 and No. 2012-070156 filed on Mar. 26, 2012, the contents all of which are incorporated herein by reference.

BACKGROUND OF THE INVENTION

1. Field of the Invention

The present invention relates to a fuel cell formed by stacking a membrane electrode assembly and a metal separator together. The membrane electrode assembly includes a pair of electrodes and an electrolyte membrane interposed between the electrodes.

2. Description of the Related Art

For example, a solid polymer electrolyte fuel cell employs a membrane electrode assembly (MEA) which includes an anode, a cathode, and an electrolyte membrane interposed between the anode and the cathode. The electrolyte membrane is a polymer ion exchange membrane. The membrane electrode assembly is sandwiched between a pair of separators. Normally, a plurality of fuel cells are stacked together, and used in stationary applications. Further, the fuel cells are mounted in a fuel cell vehicle, and used as an in-vehicle fuel cell system.

In the fuel cell, a fuel gas flow field (hereinafter also referred to as the reactant gas flow field) for supplying a fuel gas to the anode and an oxygen-containing gas flow field (hereinafter also referred to as the reactant gas flow field) for supplying an oxygen-containing gas to the cathode are provided in surfaces of separators. For each of power generation cells, or for every predetermined number of power generation cells, a coolant flow field for supplying a coolant is provided along electrode surfaces between the adjacent separators.

In the fuel cell of this type, in order to achieve the desired ion conductivity, the electrolyte membrane needs to be kept humidified. Therefore, the fuel cell adopts an approach where an oxygen-containing gas (e.g., the air) and a fuel gas (e.g., hydrogen gas) as reactant gases are humidified and the humidified reactant gases are supplied to the fuel cell.

In some cases, water for humidification is not be absorbed by the electrolyte membrane, and liquefied water is retained as stagnant water in the reactant gas flow field. Further, in the fuel cell, water is produced at the cathode by power generation reaction, and the produced water is diffused backward to the anode through the electrolyte membrane. Therefore, under the effect of the gravity, the water content tends to be condensed and retained at the lower end of the reactant gas flow field, and consequently, flooding of the condensed water may occur undesirably.

In this regard, as a fuel cell which is intended to make it possible to discharge gases effectively, and also discharge water efficiently, a solid polymer electrolyte fuel cell as disclosed in Japanese Patent No. 3123992 (hereinafter referred to as conventional technique 1) is known. As shown in FIG. 25, the fuel cell includes a frame body 1. A cell 2 and a cathode flow field plate 3 are fitted to one surface of the frame body 1, and an anode flow field plate 4 is fitted to the other surface of the frame body 1.

The cell 2 is formed by providing a cathode 2b and an anode 2c on a solid polymer electrolyte 2a. A plurality of cathode grooves 3a are formed on the cathode flow field plate 3, and a plurality of anode grooves 4a are formed on the anode flow field plate 4.

A pair of water inlet manifold holes 5a, a groove hole 5b connecting the water inlet manifold holes 5a to the anode grooves 4a, a pair of fuel gas inlet manifold holes 6a, and a groove hole 6b connecting the fuel gas inlet manifold holes 6a to the anode grooves 4a are formed on the upstream side of the frame body 1. A pair of fuel gas outlet manifold holes 7a, a groove hole 7b connecting the fuel gas outlet manifold holes 7a to the anode grooves 4a, a pair of water outlet manifold holes 8a, and a groove hole 8b connecting the water outlet manifold holes 8a to the anode grooves 4a are formed on the downstream side of the frame body 1.

The unconsumed fuel gas which has passed through the anode grooves 4a flows from the groove hole 7b through the fuel gas outlet manifold holes 7a to the outside of the fuel cell. Further, the water which has passed through the anode grooves 4a flows from the groove hole 8b through the water outlet manifold holes 8a to the outside of the cell.

However, in the conventional technique 1, the frame body 1 is elongated considerably along the flow direction of the fuel gas. Therefore, if the cathode grooves 3a are oriented horizontally, the height of the fuel cell becomes large as a whole, and in the case where the fuel cell is mounted in a vehicle, the space required for mounting the fuel cell is limited.

Moreover, water produced in power generation reaction is present in the cathode grooves 3a. The produced water moves downward in the direction of gravity, and the water may be retained as stagnant water. Consequently, the oxygen-containing gas may not be supplied sufficiently.

Further, in the fuel cell, metal separators may be used as separators. The metal separator is formed by corrugating a metal thin plate. A reactant gas flow field and a part of a coolant flow field are formed on the corrugated recesses (grooves) on front and back surfaces of the separator. The coolant flow field is formed by stacking grooves formed on the adjacent metal separators.

Further, a seal member is formed integrally with the metal separator for sealing the reactant gas flow fields, the coolant flow field or the like. At the outer periphery of the coolant flow field, grooves of the adjacent metal separators are stacked with each other. Therefore, gaps tend to be produced between the seal member and the outer periphery of the coolant flow field. As a result, the coolant may bypass the coolant flow field, and flow between the outer periphery of the coolant flow field and the seal members, i.e., so called shortcuts of the coolant may occur.

In this regard, for example, a fuel cell disclosed in Japanese Laid-Open Patent Publication No. 2011-171222 (hereinafter referred to as conventional technique 2) is known. The conventional technique 2 relates to a fuel cell formed by stacking electrolyte electrode assemblies and rectangular metal separators together. Each of the electrolyte electrode assemblies includes a pair of electrodes and an electrolyte interposed between the electrodes. A coolant flow field is formed between the metal separators, around the electrode area for supplying a coolant in a longitudinal direction of the metal separators. At one end of the metal separators in the longitudinal direction, a pair of coolant supply passages are provided on both sides of the coolant flow field, and at the other end of the metal separators in the longitudinal direction, a pair of coolant discharge passages are provided on both sides of the coolant flow field.

The coolant flow field is formed between a plurality of corrugated ridges, and a blocking seal is provided for the coolant flow field. The blocking seal contacts a side portion of the corrugated ridge at the outermost position of the coolant flow field from the outside of the metal separator, and has a shape at least protruding in correspondence with part of the side portion having the corrugated shape.

According to the disclosure, with the simple structure, it is possible to suitably supply the coolant over the entire area of the coolant flow field, and shortcuts of the coolant can be prevented as much as possible.

SUMMARY OF THE INVENTION

The present invention has been made to solve the problems of this type, and an object of the present invention is to provide a fuel cell having simple structure where though the water produced in the power generation reaction tends to be retained easily at a lower position of the electrode surface in the direction of gravity, the produced water can be discharged from the electrode surface easily and reliably.

Further, an object of the present invention is to provide a fuel cell having simple and economical structure where it is possible to prevent shortcuts of a coolant as much as possible.

The present invention relates to a fuel cell formed by stacking a membrane electrode assembly and a metal separator together horizontally in a stacking direction. The membrane electrode assembly includes a pair of electrodes and an electrolyte membrane interposed between the electrodes. Each of the electrodes has an electrode surface provided vertically along a direction of gravity. The electrode surface has a shape elongated in a horizontal direction which is orthogonal to the stacking direction of the metal separator. A reactant gas flow field is provided in the electrode surface for allowing an oxygen-containing gas or a fuel gas as a reactant gas to flow along the electrode surface in a longitudinal direction thereof.

In the fuel cell, a water discharge channel is provided at a lower end of the reactant gas flow field in the direction of gravity for discharging water produced in power generation reaction downward in the direction of gravity. The water discharge channel is formed by a corrugated section including a protrusion and a recess formed alternately on a surface where the reactant gas flow field is provided.

Further, the present invention relates to a fuel cell formed by stacking a membrane electrode assembly and metal separators together. The membrane electrode assembly includes a pair of electrodes and an electrolyte interposed between the electrodes. A coolant flow field is provided between adjacent metal separators by forming the metal separator wavily for allowing a coolant to flow through the coolant flow field.

In the fuel cell, a bypass limiting section is provided at an outer end of the coolant flow field in a width direction for preventing the coolant from bypassing the coolant flow field. Further, the bypass limiting section includes a protrusion which is formed integrally with at least one of the metal separators and which contacts another of the metal separators.

According to the present invention, when the reactant gas flows along the electrode surface elongated in the horizontal direction, water is produced by power generation reaction, and this water tends to be retained easily at a lower position of the electrode surface in the direction of gravity. In this regard, the water discharge channel is provided at the lower position of the electrode surface in the direction of gravity. Therefore, after the water moves to the lower position of the electrode surface in the direction of gravity, the water is discharged to the outside of the electrode surface through the water discharge channel.

Further, the water discharge channel is formed by the corrugated section including a protrusion and a recess formed alternately on a surface where the reactant gas flow field is provided. Thus, simply by press forming of the metal separator, with the simple structure, though the water produced in the power generation reaction tends to be retained at the lower position of the electrode surface in the direction of gravity, the water can be discharged from the electrode surface easily and reliably. Thus, the desired power generation environment of the fuel cell is suitably maintained.

Further, in the present invention, the bypass limiting section provided at the outer end of the coolant flow field includes a protrusion formed integrally with at least one of the metal separators. The protrusion of the bypass limiting section directly contacts the other metal separator. Therefore, the bypassing path formed around the coolant flow field can be blocked reliably by the protrusion. Accordingly, with the simple and economical structure, shortcuts of the coolant can be prevented as much as possible.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
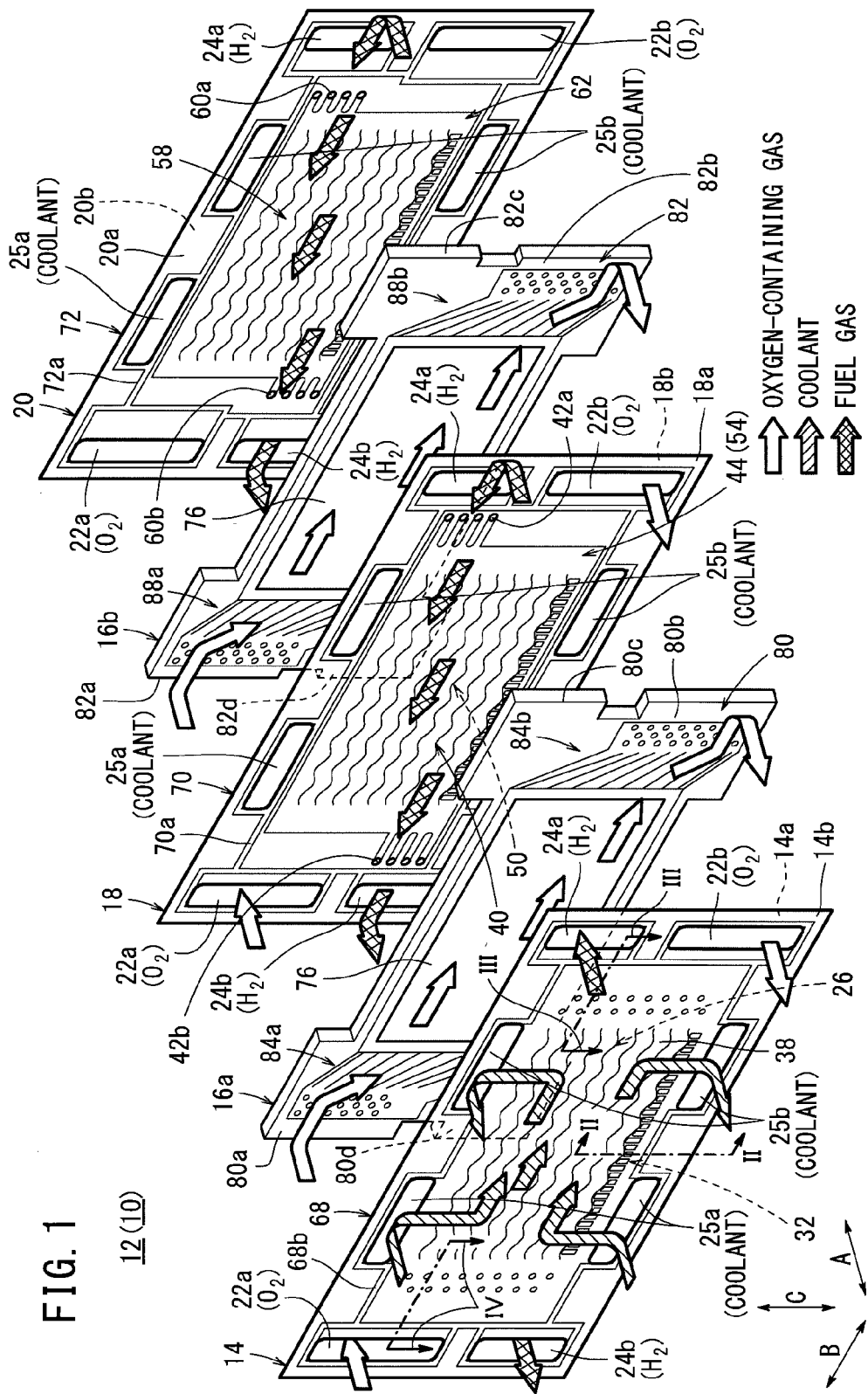
FIG. 1 is an exploded perspective view showing main components of a power generation unit of a fuel cell according to a first embodiment of the present invention.

As shown in FIGS. 1 to 4, a fuel cell 10 according to a first embodiment of the present invention includes a power generation unit 12, and a plurality of the power generation units 12 are stacked together in a horizontal direction indicated by an arrow A or a vertical direction indicated by an arrow C. The power generation unit 12 includes a first metal separator 14, a first membrane electrode assembly 16a, a second metal separator 18, a second membrane electrode assembly 16b, and a third metal separator 20. The first metal separator 14, the first membrane electrode assembly 16a, the second metal separator 18, the second membrane electrode assembly 16b, and the third metal separator 20 are stacked together in the horizontal direction. Electrode surfaces of the first membrane electrode assembly 16a and the second membrane electrode assembly 16b are provided vertically along the direction of gravity, and have a rectangular shape elongated in a horizontal direction (in the direction indicated by an arrow B).

For example, the first metal separator 14, the second metal separator 18, and the third metal separator 20 have rectangular surfaces, and are formed by corrugating metal thin plates by press forming to have corrugated shapes in cross section. For example, the metal thin plates are steel plates, stainless steel plates, aluminum plates, plated steel sheets, or metal plates having anti-corrosive surfaces by surface treatment.

As shown in FIG. 1, at one end of the power generation unit 12 in a longitudinal direction indicated by the arrow B, specifically, at one end of the first metal separator 14, the second metal separator 18, and the third metal separator 20 in the longitudinal direction, an oxygen-containing gas supply passage 22a for supplying an oxygen-containing gas, and a fuel gas discharge passage 24b for discharging a fuel gas such as a hydrogen-containing gas are provided. The oxygen-containing gas supply passage 22a and the fuel gas discharge passage 24b extend through the power generation unit 12 in the direction indicated by an arrow A.

At the other end of the power generation unit 12 in the longitudinal direction indicated by the arrow B, a fuel gas supply passage 24a for supplying the fuel gas and an oxygen-containing gas discharge passage 22b for discharging the oxygen-containing gas are provided. The fuel gas supply passage 24a and the oxygen-containing gas discharge passage 22b extend through the power generation unit 12 in the direction indicated by the arrow A.

At both ends of the power generation unit 12 in a lateral or vertical direction indicated by the arrow C, a pair of coolant supply passages 25a for supplying a coolant are provided adjacent to the oxygen-containing gas supply passage 22a. At both ends of the power generation unit 12 in the lateral direction, a pair of coolant discharge passages 25b for discharging the coolant are provided adjacent to the fuel gas supply passage 24a. The coolant supply passages 25a and the coolant discharge passages 25b extend through the power generation unit 12 in the direction indicated by the arrow A.

Figure 5:
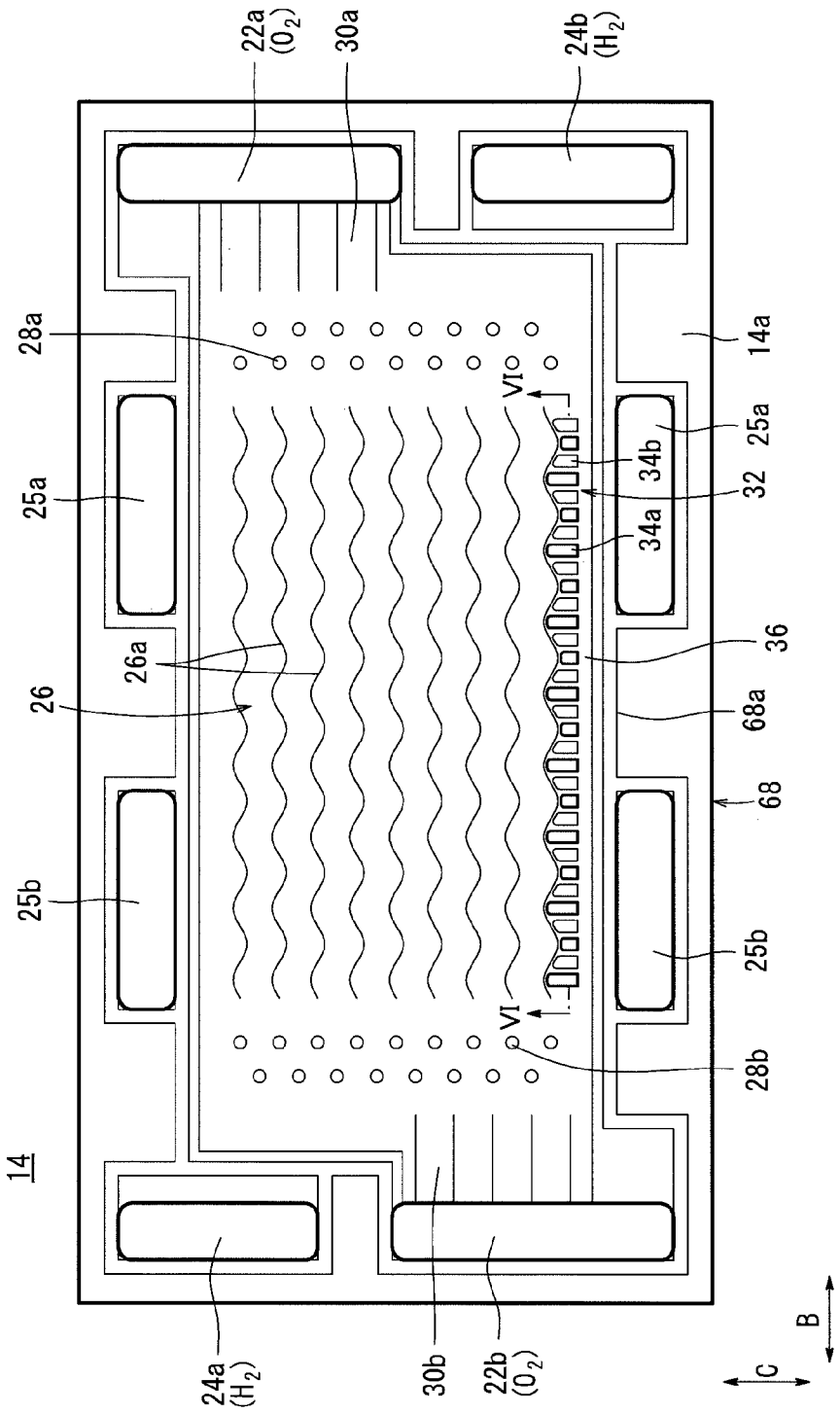
FIG. 5 is a front view showing a first metal separator of the power generation unit.

As shown in FIG. 5, the first metal separator 14 has a first oxygen-containing gas flow field 26 on its surface 14a facing the first membrane electrode assembly 16a. The first oxygen-containing gas flow field 26 is connected to the oxygen-containing gas supply passage 22a and the oxygen-containing gas discharge passage 22b.

The first oxygen-containing gas flow field 26 includes a plurality of wavy flow grooves (or straight flow grooves) 26a extending in the direction indicated by the arrow B. An inlet embossed section 28a and an outlet embossed section 28b are provided adjacent to the inlet and the outlet of the first oxygen-containing gas flow field 26, respectively. Each of the inlet embossed section 28a and the outlet embossed section 28b has a plurality of bosses.

A plurality of inlet connection grooves 30a are formed between the inlet embossed section 28a and the oxygen-containing gas supply passage 22a to form a bridge section, and a plurality of outlet connection grooves 30b are formed between the outlet embossed section 28b and the oxygen-containing gas discharge passage 22b to form a bridge section.

A first cathode water discharge channel 32 is provided at a lower end of the first oxygen-containing gas flow field 26 in the direction of gravity, for discharging water produced in power generation from the first oxygen-containing gas flow field 26 downward in the direction of gravity. The first cathode water discharge channel 32 includes corrugated sections 34a, 34b including protrusions and recesses formed alternately on the surface 14a of the first metal separator 14 and on a surface 14b opposite to the surface 14a. The corrugated sections 34a, 34b are formed along the outer shape of a wavy flow groove 26a at the lowermost position in the direction of gravity, by press forming of the first metal separator 14.

Figure 6:
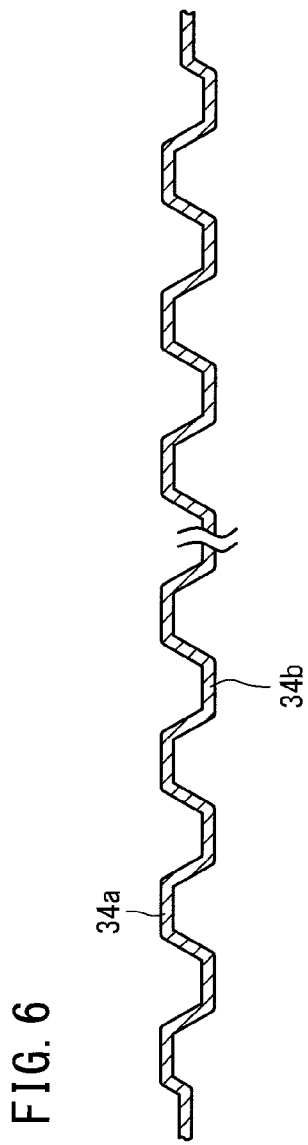
FIG. 6 is a cross sectional view showing the first metal separator, taken along a line VI-VI in FIG. 5.

The corrugated section 34a includes protrusions expanded from the surface 14a (recesses as viewed from the back surface), and the corrugated section 34b includes protrusions expanded from the surface 14b (recessed as viewed from the back surface) (see FIG. 6). The length of the corrugated sections 34a, 34b (dimension in the direction indicated by the arrow C) changes cyclically in correspondence with the shape of the wavy flow grooves 26a. If the straight flow grooves are adopted instead of the wavy flow grooves 26a, the corrugated sections 34a, 34b have a constant length.

Figure 2:
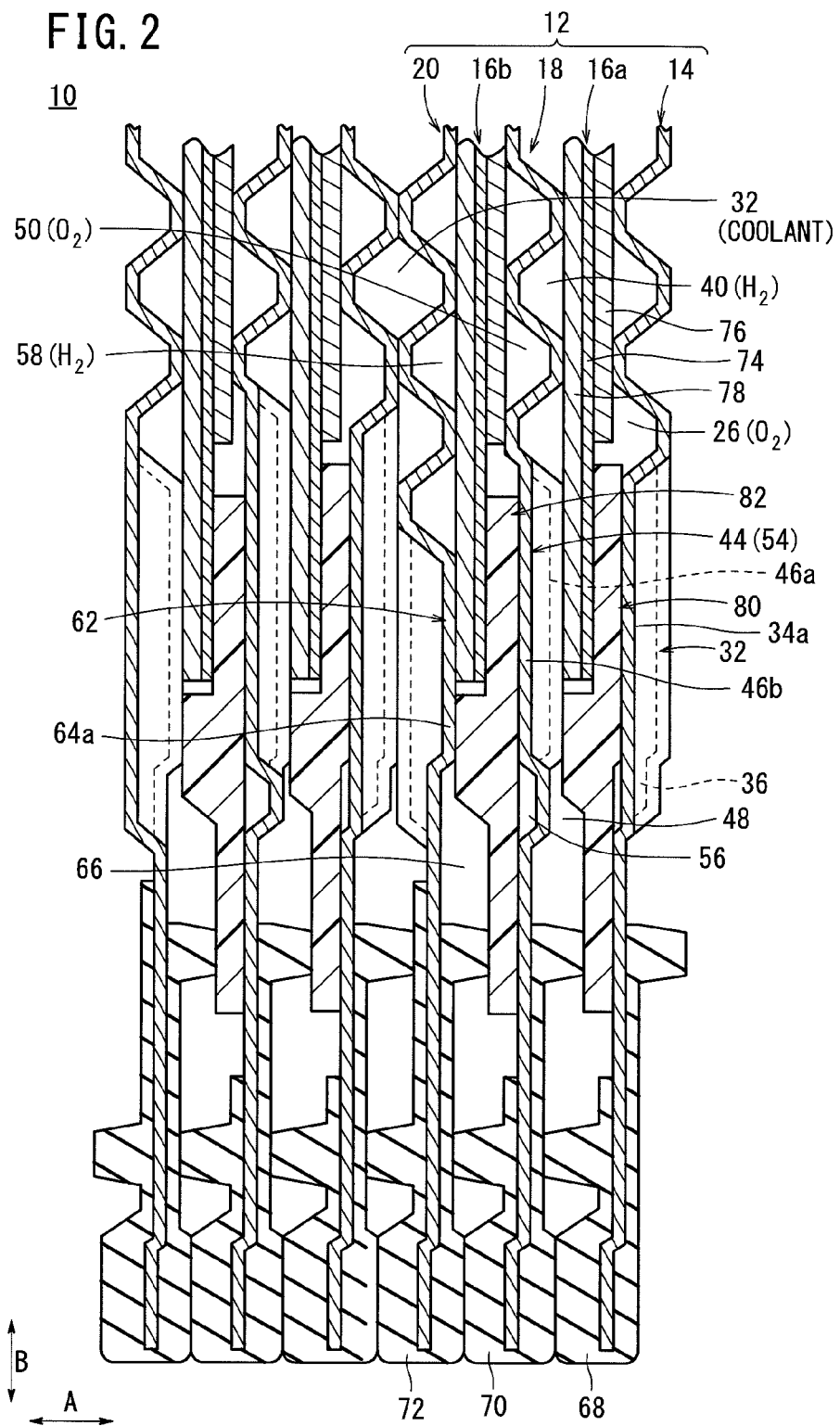
FIG. 2 is a cross sectional view showing the power generation unit, taken along a line II-II in FIG. 1.

As shown in FIG. 2, the corrugated section 34a contacts a first resin frame member 80 described later to partially block the first cathode water discharge channel 32. As shown in FIG. 5, a water discharge flow field 36 is provided below the first cathode water discharge channel 32 and extends in the direction indicated by the arrow B. The pressure loss of the water discharge flow field 36 is larger than the pressure loss per one groove of the first oxygen-containing gas flow field 26, and the water discharge flow field 36 is connected to the oxygen-containing gas discharge passage 22b.

As shown in FIG. 1, a coolant flow field 38 is formed on the surface 14b of the first metal separator 14. The coolant flow field 38 is connected to the pair of coolant supply passages 25a and the pair of coolant discharge passages 25b. The coolant flow field 38 is formed by stacking the back surface of the first oxygen-containing gas flow field 26 and the back surface of a second fuel gas flow field 58 (described later) such that the shape of the back surface of the first oxygen-containing gas flow field 26 and the shape of the back surface of the second fuel gas flow field 58 are in opposite phases. The shape of the back surface of the first oxygen-containing gas flow field 26 and the shape of the back surface of the second fuel gas flow field 58 may be in the same phase.

Figure 7:
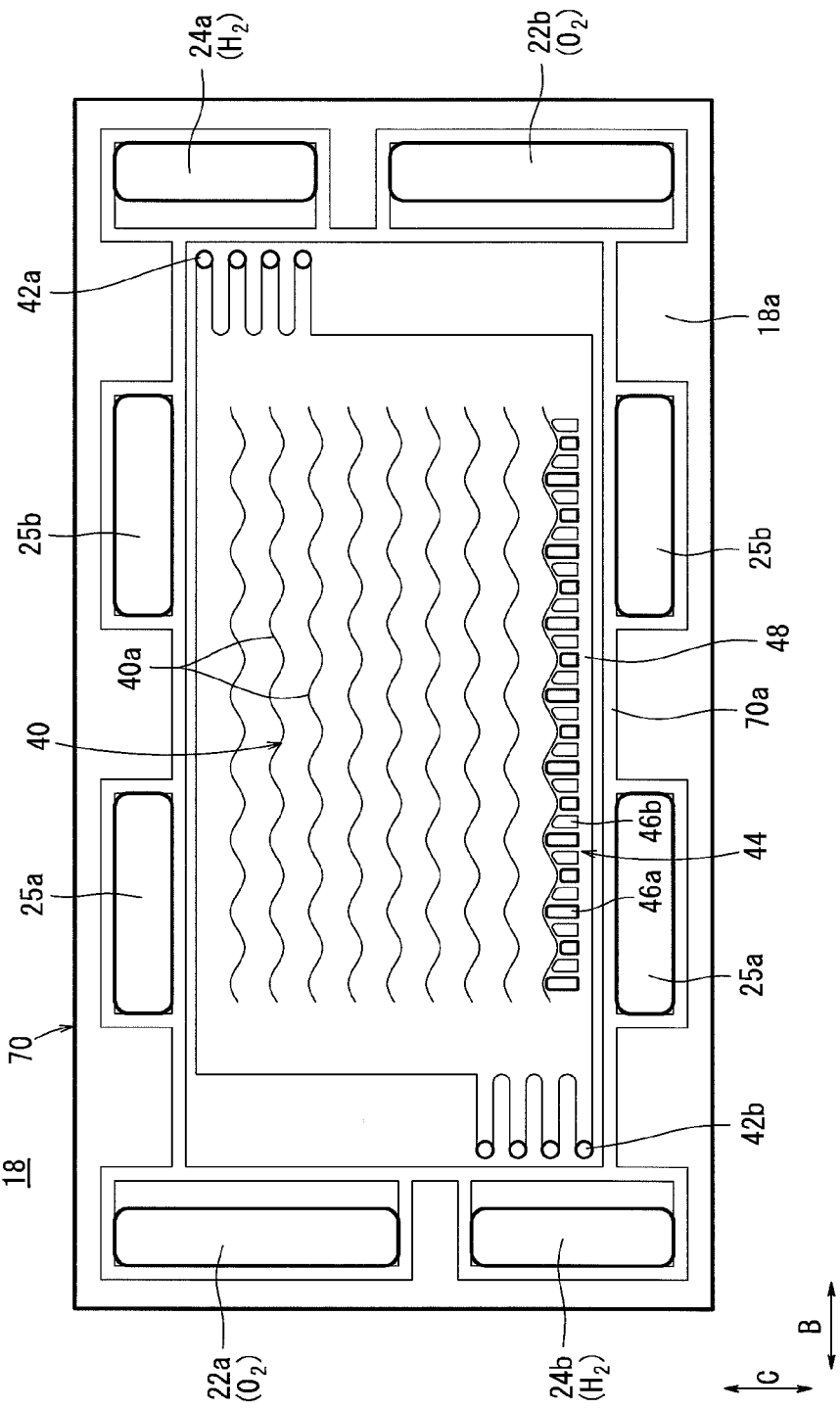
FIG. 7 is a view showing one surface of a second metal separator of the power generation unit.

As shown in FIG. 7, the second metal separator 18 has a first fuel gas flow field 40 on its surface 18a facing the first membrane electrode assembly 16a. The first fuel gas flow field 40 is connected to the fuel gas supply passage 24a and the fuel gas discharge passage 24b. The first fuel gas flow field 40 includes a plurality of wavy flow grooves (or straight flow grooves) 40a extending in the direction indicated by the arrow B. A plurality of supply holes 42a are formed adjacent to the fuel gas supply passage 24a, and a plurality of discharge holes 42b are formed adjacent to the fuel gas discharge passage 24b.

A first anode water discharge channel 44 is provided at a lower end of the first fuel gas flow field 40 in the direction of gravity, for discharging water (backwardly diffused water) produced in power generation from the first fuel gas flow field 40 downward in the direction of gravity. The first anode water discharge channel 44 includes corrugated sections 46a, 46b including protrusions and recesses formed alternately on the surface 18a of the second metal separator 18 and on a surface 18b opposite to the surface 14a.

The corrugated section 46a includes protrusions expanded from the surface 18a (recesses as viewed from the back surface), and the corrugated section 46b includes protrusions expanded from the surface 18b (recessed as viewed from the back surface). The length of the corrugated sections 46a, 46b (dimension in the direction indicated by the arrow C) changes cyclically in correspondence with the shape of the wavy flow grooves 40a. If the straight flow grooves are adopted instead of the wavy flow grooves 40a, the corrugated sections 46a, 46b have a constant length.

As shown in FIG. 2, the corrugated section 46a contacts an anode 78 of the first membrane electrode assembly 16a described later to partially block the first anode water discharge channel 44. As shown in FIG. 7, a water discharge flow field 48 is provided below the first anode water discharge channel 44 and extends in the direction indicated by the arrow B. The pressure loss of the water discharge flow field 48 is larger than the pressure loss per one groove of the first fuel gas flow field 40, and the water discharge flow field 48 is connected to the discharge holes 42b.

Figure 8:
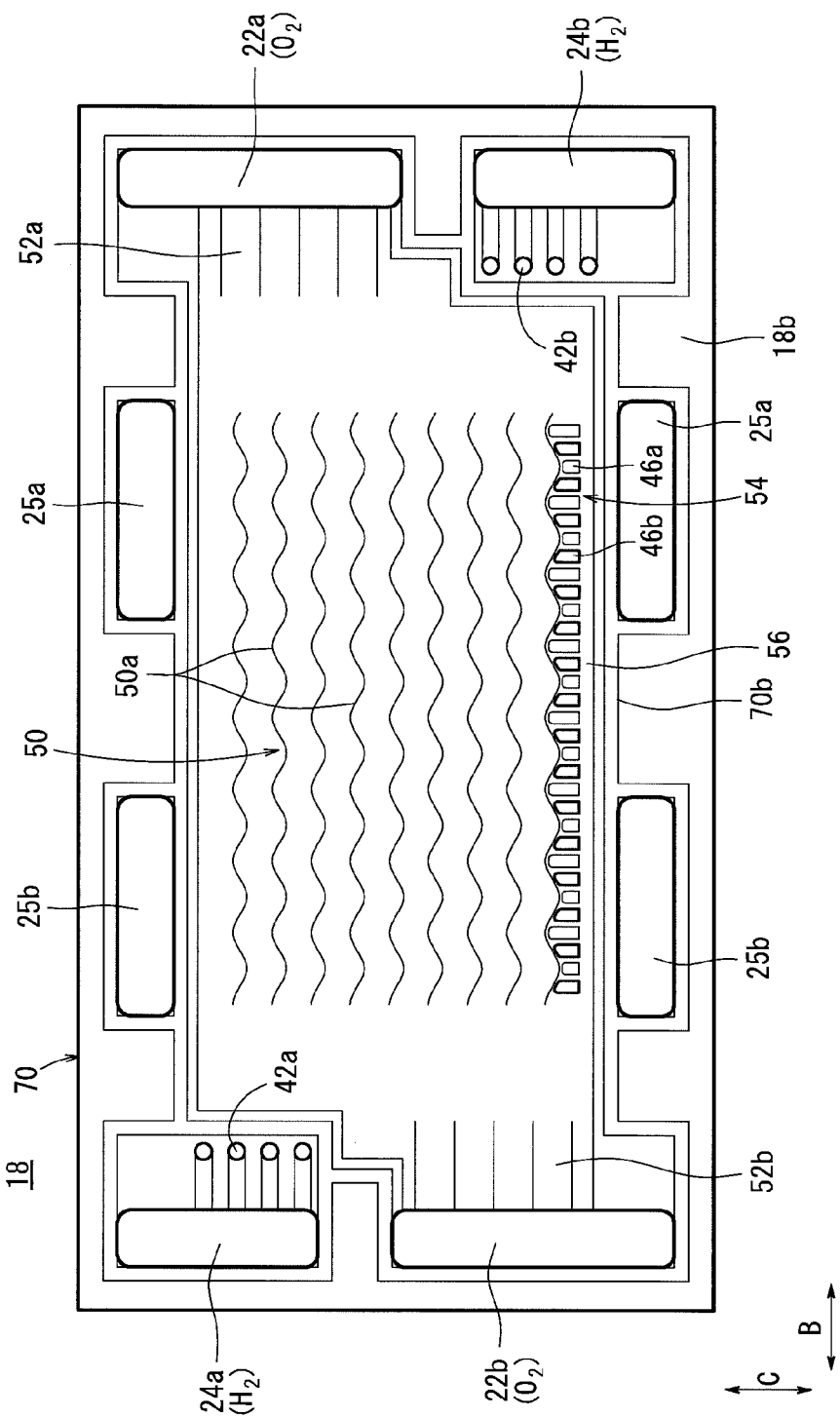
FIG. 8 is a view showing the other surface of the second metal separator.

As shown in FIG. 8, the second metal separator 18 has a second oxygen-containing gas flow field 50 on its surface 18b facing the second membrane electrode assembly 16b. The second oxygen-containing gas flow field 50 is connected to the oxygen-containing gas supply passage 22a and the oxygen-containing gas discharge passage 22b. The second oxygen-containing gas flow field 50 includes a plurality of wavy flow grooves (or straight flow grooves) 50a extending in the direction indicated by the arrow B. A plurality of inlet connection grooves 52a are formed adjacent to the oxygen-containing gas supply passage 22a, and a plurality of outlet connection grooves 52b are formed adjacent to the oxygen-containing gas discharge passage 22b.

A second cathode water discharge channel 54 is provided at a lower end of the second oxygen-containing gas flow field 50 in the direction of gravity, for discharging water produced in power generation from the second oxygen-containing gas flow field 50 downward in the direction of gravity. The second cathode water discharge channel 54 includes corrugated sections 46a, 46b on the back surface of the first anode water discharge channel 44. As shown in FIG. 2, the corrugated section 46b contacts a second resin frame member 82 described later to partially block the second cathode water discharge channel 54. As shown in FIG. 8, a water discharge flow field 56 is provided below the second cathode water discharge channel 54 and extends in the direction indicated by the arrow B. The water discharge flow field 56 is connected to the oxygen-containing gas discharge passage 22b.

Figure 9:
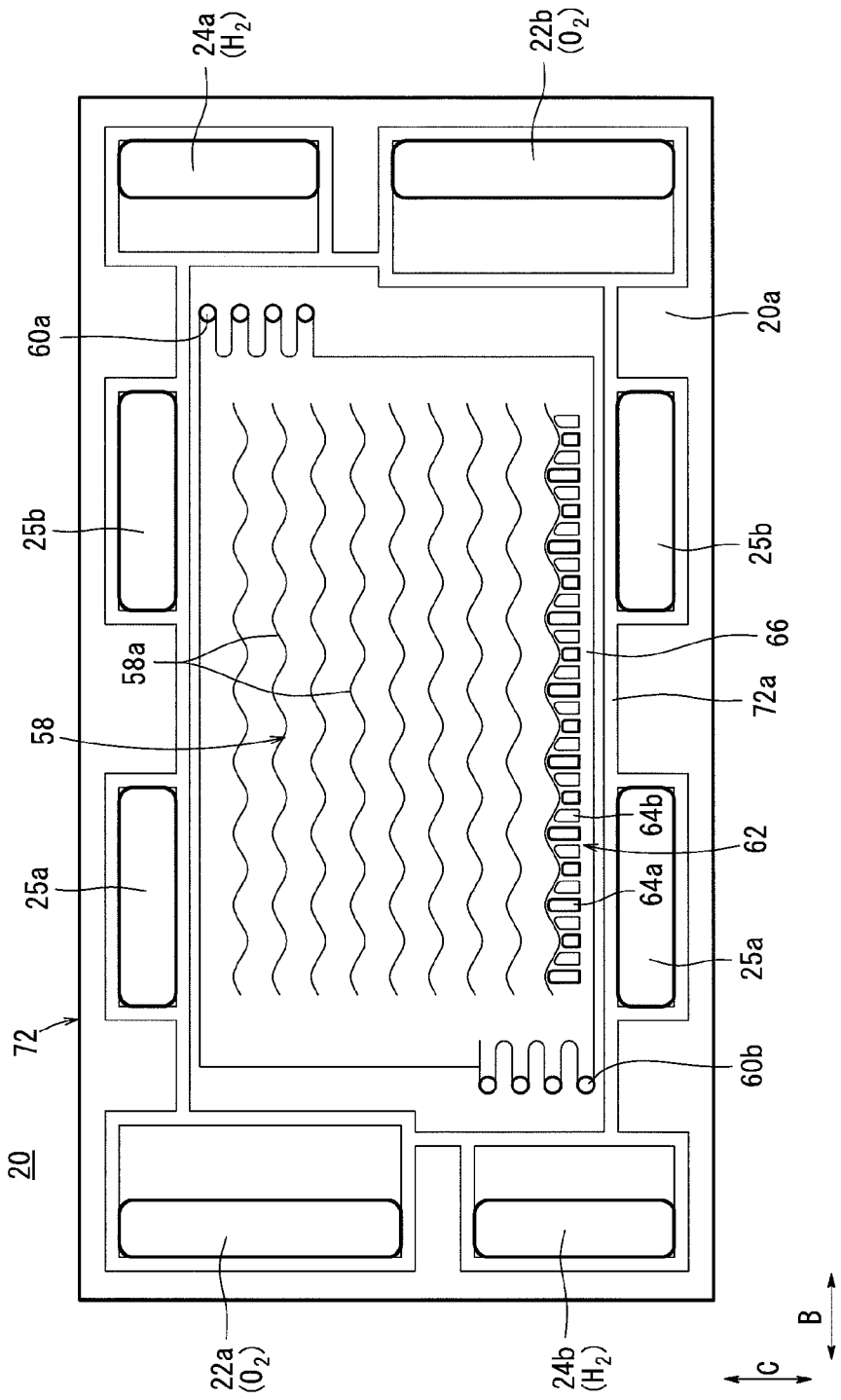
FIG. 9 is a view showing one surface of a third metal separator of the power generation unit.

As shown in FIG. 9, the third metal separator 20 has the second fuel gas flow field 58 on its surface 20a facing the second membrane electrode assembly 16b. The second fuel gas flow field 58 is connected to the fuel gas supply passage 24a and the fuel gas discharge passage 24b. The second fuel gas flow field 58 includes a plurality of wavy flow grooves (or straight flow grooves) 58a extending in the direction indicated by the arrow B.

Figure 3:
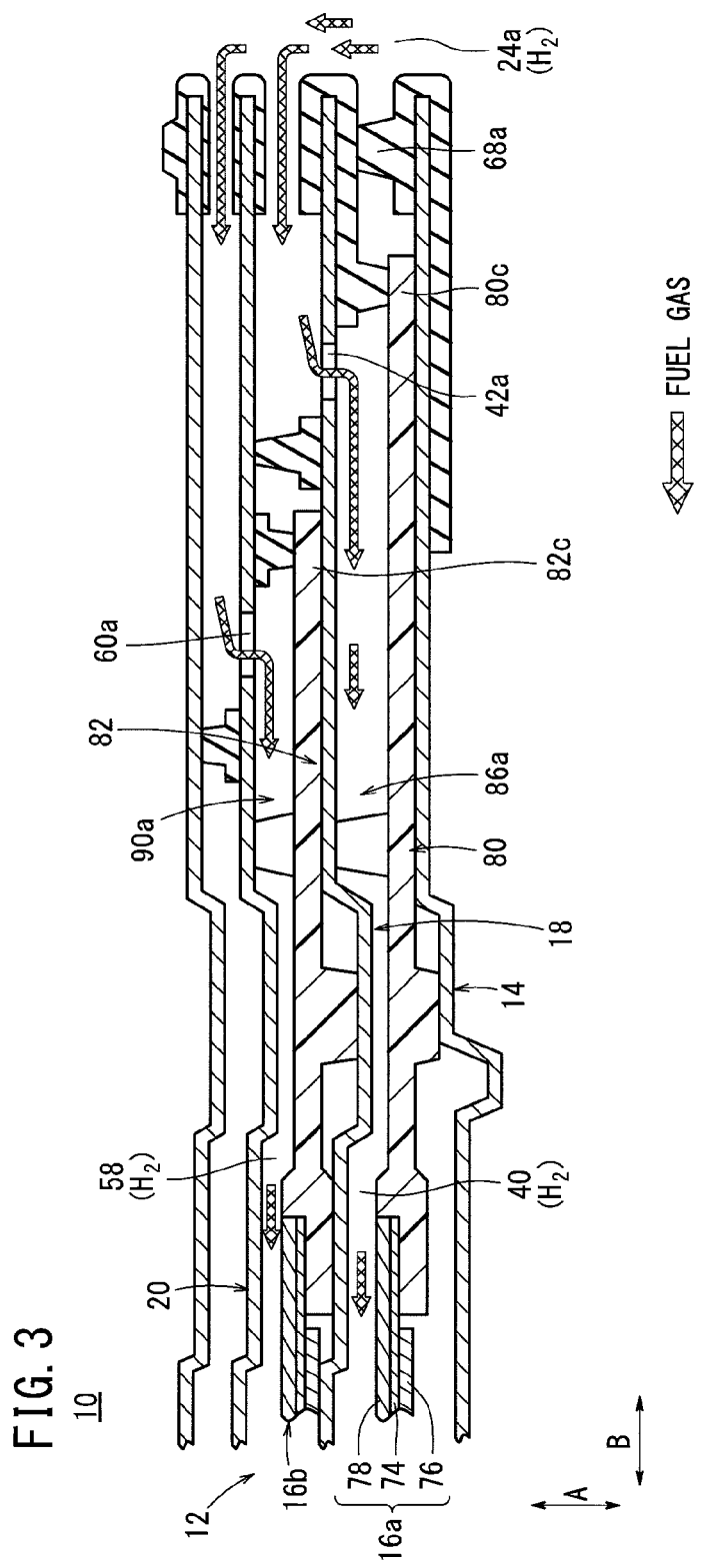
FIG. 3 is a cross sectional view showing the power generation unit, taken along a line III-III in FIG. 1.

A plurality of supply holes 60a are formed adjacent to the fuel gas supply passage 24a, and a plurality of discharge holes 60b are formed adjacent to the fuel gas discharge passage 24b. As shown in FIGS. 1 and 3, the supply holes 60a are formed on the inner side (adjacent to the fuel gas flow field) in comparison with the supply holes 42a of the second metal separator 18, and the discharge holes 60b are formed on the inner side (adjacent to the fuel gas flow field) in comparison with the discharge holes 42b of the second metal separator 18.

As shown in FIG. 9, a second anode water discharge channel 62 is provided at a lower end of the second fuel gas flow field 58 in the direction of gravity, for discharging water (backwardly diffused water) produced in power generation from the second fuel gas flow field 58 downward in the direction of gravity. The second anode water discharge channel 62 includes corrugated sections 64a, 64b including protrusions and recesses formed alternately on the surface 20a of the third metal separator 20 and on a surface 20b opposite to the surface 20a.

The corrugated section 64a includes protrusions expanded from the surface 20a (recesses as viewed from the back surface), and the corrugated section 64b includes protrusions expanded from the surface 20b (recessed as viewed from the back surface). The length of the corrugated sections 64a, 64b (dimension in the direction indicated by the arrow C) changes cyclically in correspondence with the shape of the wavy flow grooves 58a. If the straight flow grooves are adopted instead of the wavy flow grooves 58a, the corrugated sections 64a, 64b have a constant length.

As shown in FIG. 2, the corrugated section 64a contacts an anode 78 of a second membrane electrode assembly 16b described later to partially block the second anode water discharge channel 62. As shown in FIG. 9, a water discharge flow field 66 is provided below the second anode water discharge channel 62 and extends in the direction indicated by the arrow B. The pressure loss of the water discharge flow field 66 is larger than the pressure loss per one groove of the second fuel gas flow field 58, and the water discharge flow field 66 is connected to the discharge holes 60b.

Figure 10:
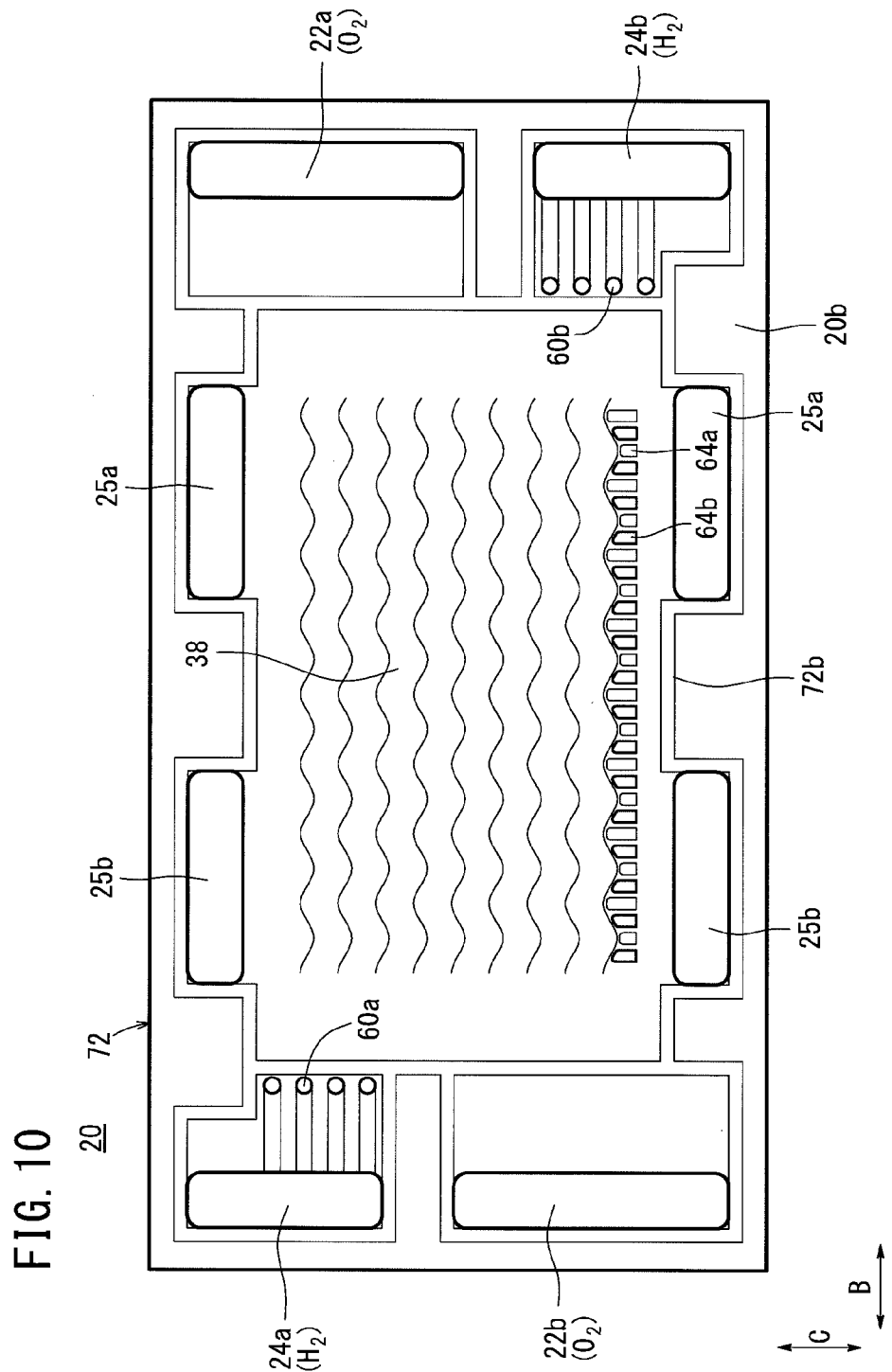
FIG. 10 is a view showing the other surface of the third metal separator.

As shown in FIG. 10, the coolant flow field 38 is partially formed on the surface 20b of the third metal separator 20 as the back surface of the second fuel gas flow field 58. The surface 14b of the first metal separator 14 which is adjacent to the third metal separator 20 is stacked on the surface 20b of the third metal separator 20 such that the coolant flow field 38 is formed between the surface 14b of the first metal separator 14 and the surface 20b of the third metal separator 20. The corrugated sections 64a, 64b are provided on the back surface of the second anode water discharge channel 62 at the lower end of the coolant flow field 38 in the direction of gravity.

In this case, the first metal separator 14 has the corrugated sections 34a, 34b, the second metal separator 18 has the corrugated sections 46a, 46b, and the third metal separator 20 has the corrugated sections 64a, 64b. The embodiment, however, is not limited to this structure. The corrugated sections of this type may be provided to at least one of the first metal separator 14, the second metal separator 18, and the third metal separator 20.

As shown in FIG. 1, a first seal member 68 is formed integrally on the surfaces 14a, 14b of the first metal separator 14, around the outer end of the first metal separator 14. A second seal member 70 is formed integrally on the surfaces 18a, 18b of the second metal separator 18, around the outer end of the second metal separator 18. A third seal member 72 is formed integrally on the surfaces 20a, 20b of the third metal separator 20, around the outer end of the third metal separator 20.

Each of the first seal member 68, the second seal member 70, and the third seal member 72 is made of seal material, cushion material, or packing material having elasticity, such as an EPDM (Ethylene Propylene Diene Monomer) rubber, an NBR (nitrile butadiene rubber), a fluoro rubber, a silicone rubber, a fluorosilicone rubber, a Butyl rubber, a natural rubber, a styrene rubber, a chloroprene rubber, or an acrylic rubber.

As shown in FIG. 5, the first seal member 68 includes a first ridge seal 68a on the surface 14a of the first metal separator 14, and the first ridge seal 68a allows the oxygen-containing gas supply passage 22a and the oxygen-containing gas discharge passage 22b to be connected to the outer ends of the first oxygen-containing gas flow field 26. As shown in FIG. 1, the first seal member 68 includes a second ridge seal 68b on the surface 14b of the first metal separator 14. The second ridge seal 68b allows the coolant supply passage 25a and the coolant discharge passage 25b to be connected to the outer ends of the coolant flow field 38.

As shown in FIG. 7, the second seal member 70 includes a first ridge seal 70a on the surface 18a of the second metal separator 18, around the supply holes 42a, the discharge holes 42b, and the first fuel gas flow field 40. The first ridge seal 70a allows the supply holes 42a and the discharge holes 42b to be connected to the first fuel gas flow field 40.

As shown in FIG. 8, the second seal member 70 includes a second ridge seal 70b on the surface 18b of the second metal separator 18. The second seal member 70 allows the oxygen-containing gas supply passage 22a and the oxygen-containing gas discharge passage 22b to be connected to outer ends of the second oxygen-containing gas flow field 50.

As shown in FIG. 9, the third seal member 72 includes a first ridge seal 72a on the surface 20a of the third metal separator 20, around the supply holes 60a, the discharge holes 60b, and the second fuel gas flow field 58. The first ridge seal 72a allows the supply holes 60a and the discharge holes 60b to be connected to the second fuel gas flow field 58.

As shown in FIG. 10, the third seal member 72 includes a second ridge seal 72b on the surface 20b of the third metal separator 20. The second ridge seal 72b allows the coolant supply passage 25a and the coolant discharge passage 25b to be connected to outer ends of the coolant flow field 38.

As shown in FIG. 2, each of the first membrane electrode assembly 16a and the second membrane electrode assembly 16b includes a cathode 76, an anode 78, and a solid polymer electrolyte membrane 74 interposed between the cathode 76 and the anode 78. The solid polymer electrolyte membrane 74 is formed by impregnating a thin membrane of perfluorosulfonic acid with water, for example. The surface size (surface area) of the cathode 76 is smaller than the surface sizes of the anode 78 and the solid polymer electrolyte membrane 74, e.g., as a stepped-type MEA. Alternatively, the surface size of the cathode 76 may be the same as the surface sizes of the anode 78 and the solid polymer electrolyte membrane 74, or the surface size of the anode 78 may be smaller than the surface sizes of the cathode 76 and the solid polymer electrolyte membrane 74.

Each of the cathode 76 and the anode 78 has a gas diffusion layer (not shown) such as a carbon paper, and an electrode catalyst layer (not shown) having platinum alloy supported on porous carbon particles. The carbon particles are deposited uniformly on the surface of the gas diffusion layer. The electrode catalyst layer of the cathode 76 and the electrode catalyst layer of the anode 78 are fixed to both surfaces of the solid polymer electrolyte membrane 74, respectively.

In the first membrane electrode assembly 16a, the first resin frame member 80 is formed integrally with the outer periphery of the solid polymer electrolyte membrane 74, around the outer end of the cathode 76, e.g., by injection molding. In the second membrane electrode assembly 16b, the second resin frame member 82 is formed integrally with the outer periphery of the solid polymer electrolyte membrane 74, around the outer end of the cathode 76, e.g., by injection molding.

As the resin material of the first resin frame member 80 and the second resin frame member 82, general purpose plastic may be adopted. Also, engineering plastic, super engineering plastic, or the like may be adopted. Otherwise, the cathode 76 and the anode 78 may be extended to a supposed outer periphery position of the resin frame members so that the first resin frame member 80 and the second resin frame member 82 can be dispensed with.

Figure 11:
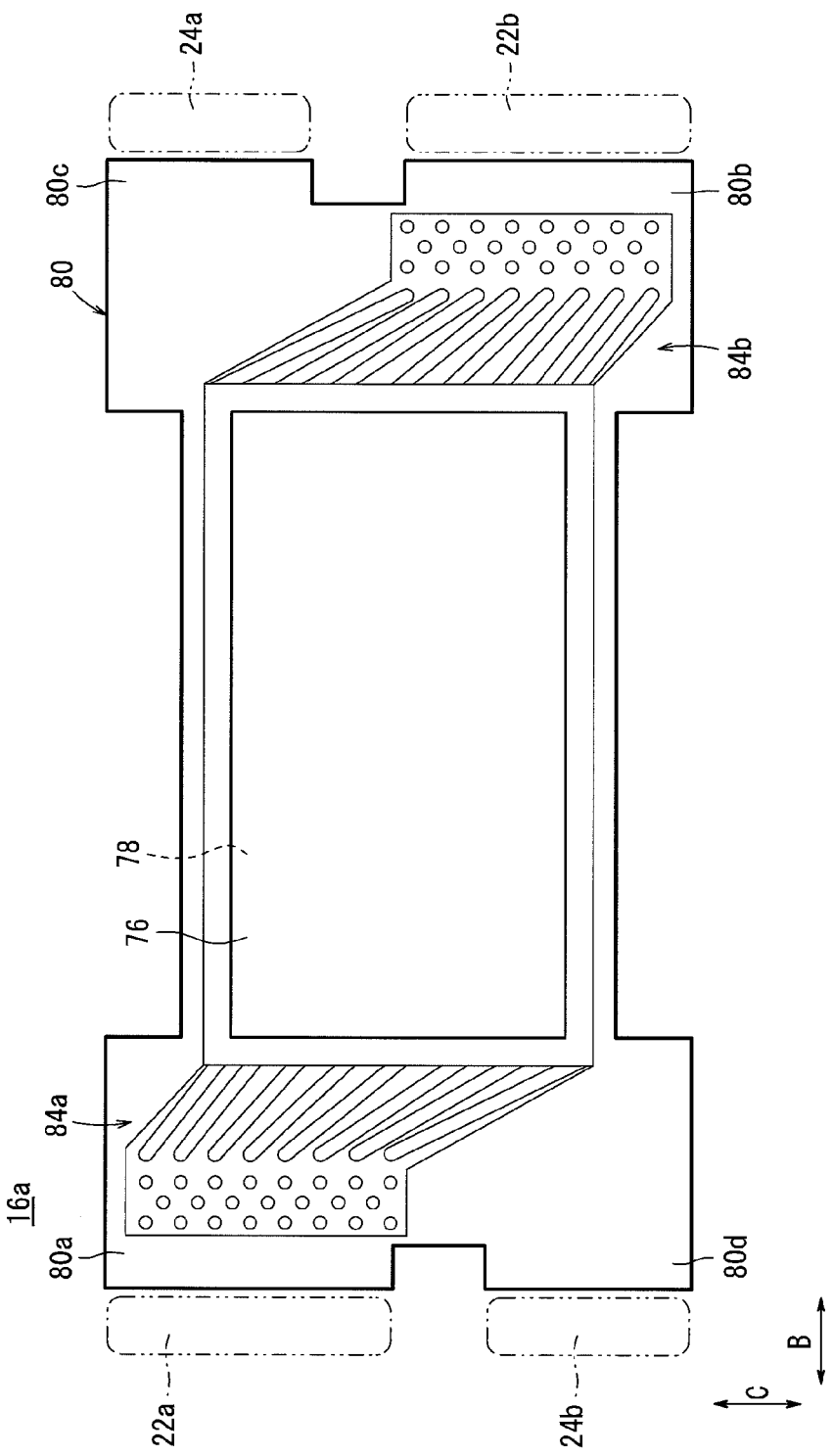
FIG. 11 is a view showing one surface of a first membrane electrode assembly of the power generation unit.
Figure 12:
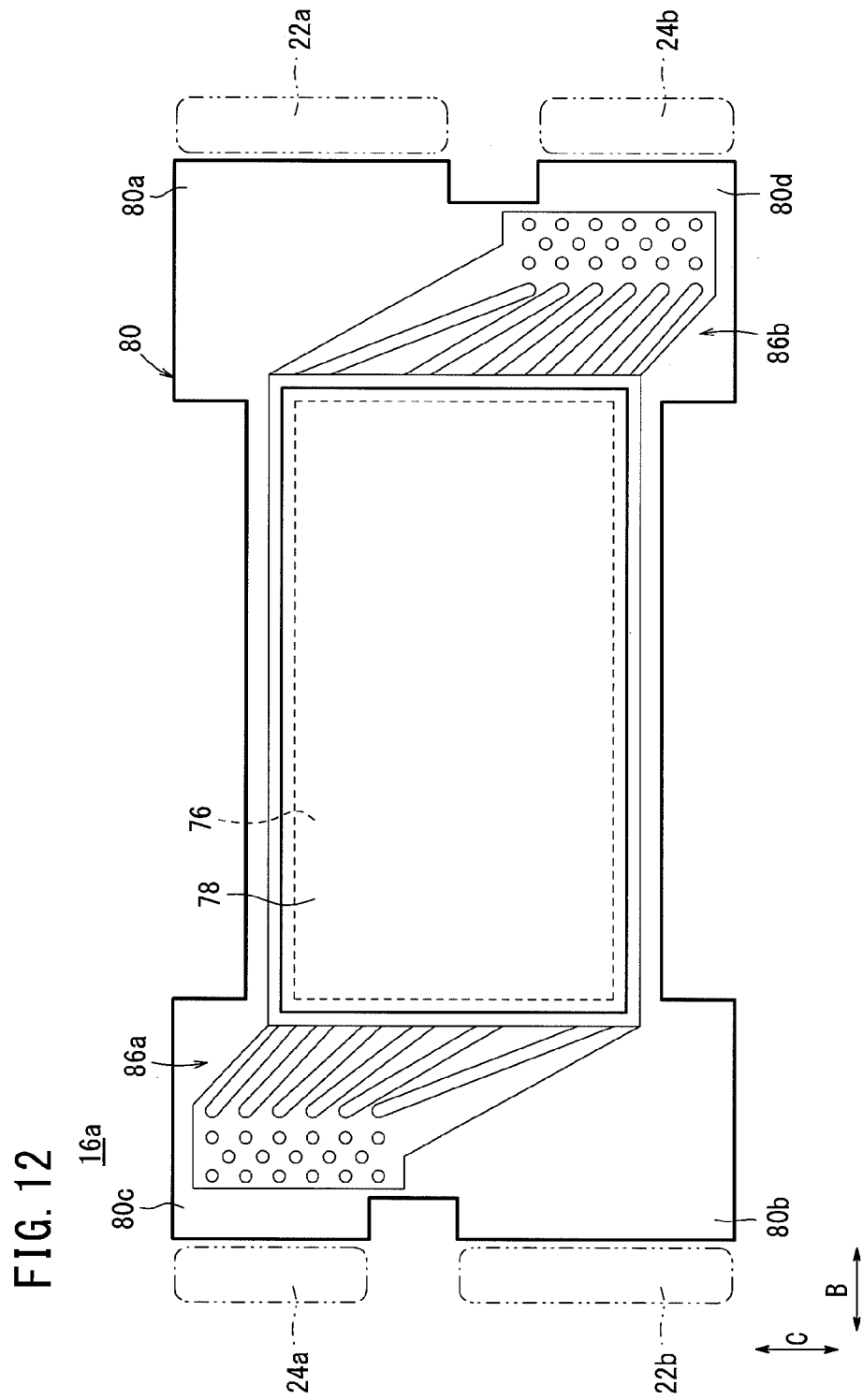
FIG. 12 is a view showing the other surface of the first membrane electrode assembly.

As shown in FIGS. 11 and 12, at both ends of the first resin frame member 80, extensions 80a, 80b are expanded toward the oxygen-containing gas supply passage 22a and the oxygen-containing gas discharge passage 22b, and extensions 80c, 80d are expanded toward the fuel gas supply passage 24a and the fuel gas discharge passage 24b.

As shown in FIG. 11, on a surface of the first resin frame member 80 where the cathode 76 is provided, an inlet buffer 84a is provided between the oxygen-containing gas supply passage 22a and the inlet of the first oxygen-containing gas flow field 26, and an outlet buffer 84b is provided between the oxygen-containing gas discharge passage 22b and the outlet of the first oxygen-containing gas flow field 26. Each of the inlet buffer 84a and the outlet buffer 84b is formed by straight ridges and bosses. Alternatively, each of the inlet buffer 84a and the outlet buffer 84b is formed by only the straight ridges or only the bosses. The other buffers described later have the same structure.

As shown in FIG. 12, on a surface of the first resin frame member 80 where the anode 78 is provided, an inlet buffer 86a is provided between the fuel gas supply passage 24a and the first fuel gas flow field 40, and an outlet buffer 86b is provided between the fuel gas discharge passage 24b and the first fuel gas flow field 40.

Figure 13:
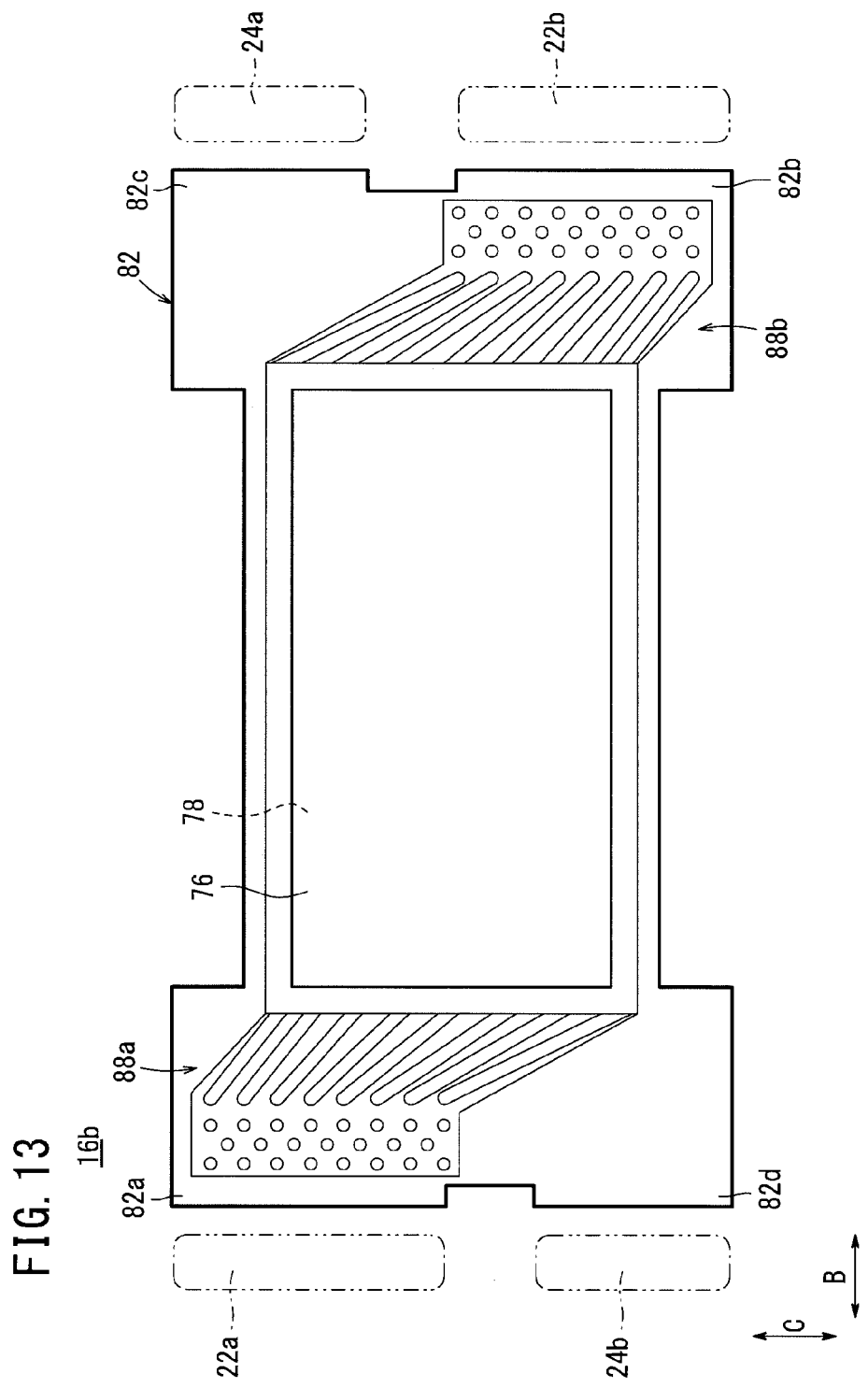
FIG. 13 is a view showing one surface of the second membrane electrode assembly of the power generation unit.
Figure 14:
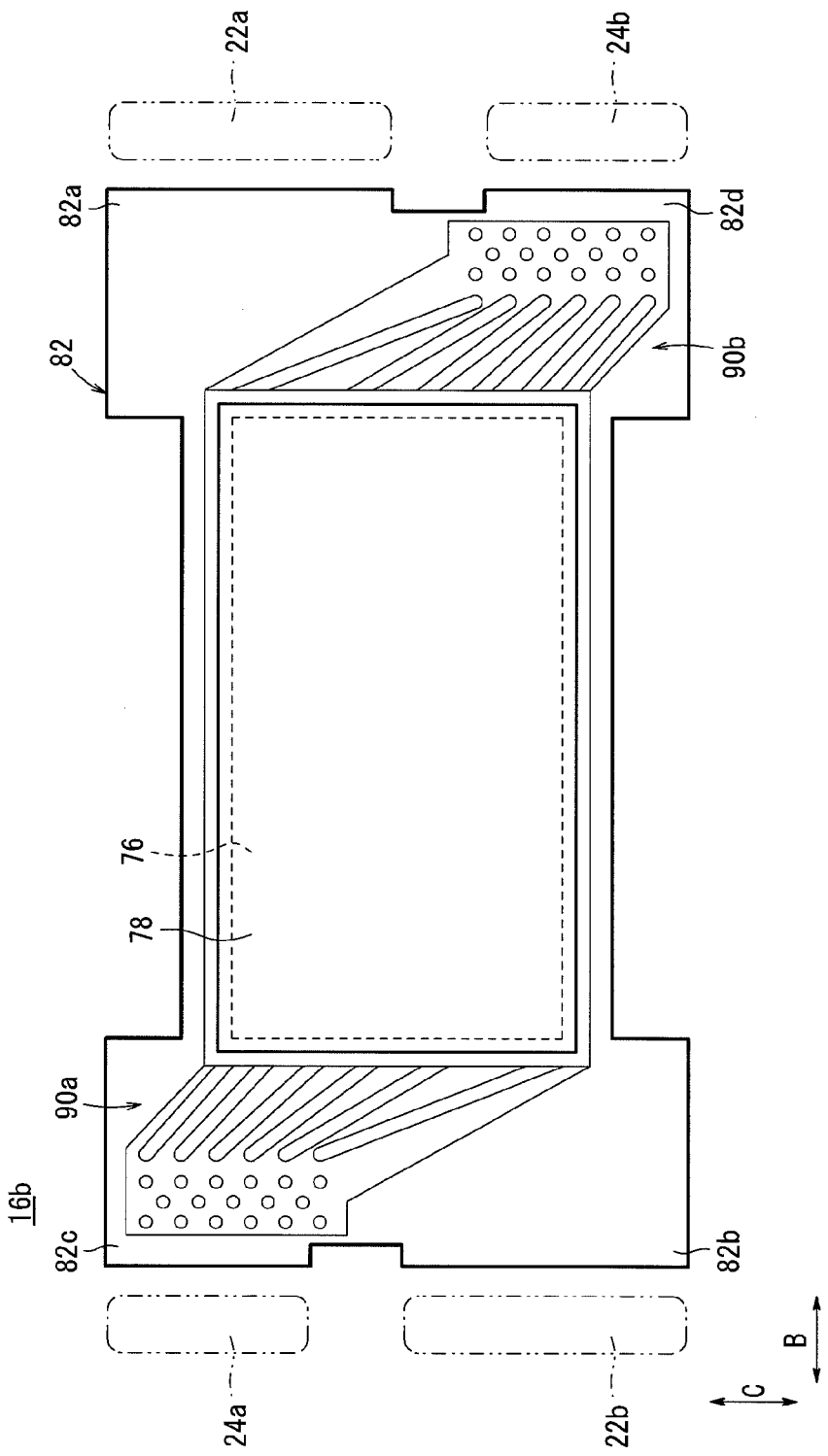
FIG. 14 is a view showing the other surface of the second membrane electrode assembly.

As shown in FIGS. 13 and 14, the second resin frame member 82 of the second membrane electrode assembly 16b has extensions 82a, 82b, 82c, and 82d expanded toward the oxygen-containing gas supply passage 22a, the oxygen-containing gas discharge passage 22b, the fuel gas supply passage 24a, and the fuel gas discharge passage 24b.

As shown in FIG. 13, on a surface of the second resin frame member 82 where the cathode 76 is provided, an inlet buffer 88a is provided between the oxygen-containing gas supply passage 22a and the second oxygen-containing gas flow field 50, and an outlet buffer 88b is formed between the oxygen-containing gas discharge passage 22b and the second oxygen-containing gas flow field 50.

As shown in FIG. 14, on a surface of the second resin frame member 82 where the anode 78 is provided, an inlet buffer 90a is provided between the fuel gas supply passage 24a and the second fuel gas flow field 58, and an outlet buffer 90b is provided between the fuel gas discharge passage 24b and the second fuel gas flow field 58.

By stacking the power generation units 12 together, the corrugated section 34b on the surface 14b of the first metal separator 14 in one of the adjacent power generation units 12 contacts the corrugated section 64b on the surface 20b of the third metal separator 20 in the other of the adjacent power generation units 12, thereby forming the coolant flow field 38 therebetween. The protrusions on the surface 14a of the first metal separator 14 do not necessarily need to face the protrusions on the surface 18a of the second metal separator 18. Similarly, the protrusions on the surface 18b of the second metal separator 18 do not necessarily need to face the protrusions on the surface 20a of the third metal separator 20.

Operation of the fuel cell 10 will be described below.

Firstly, as shown in FIG. 1, an oxygen-containing gas is supplied to the oxygen-containing gas supply passage 22a, and a fuel gas such as a hydrogen-containing gas is supplied to the fuel gas supply passage 24a. Further, a coolant such as pure water, ethylene glycol or oil is supplied to the coolant supply passages 25a.

Figure 4:
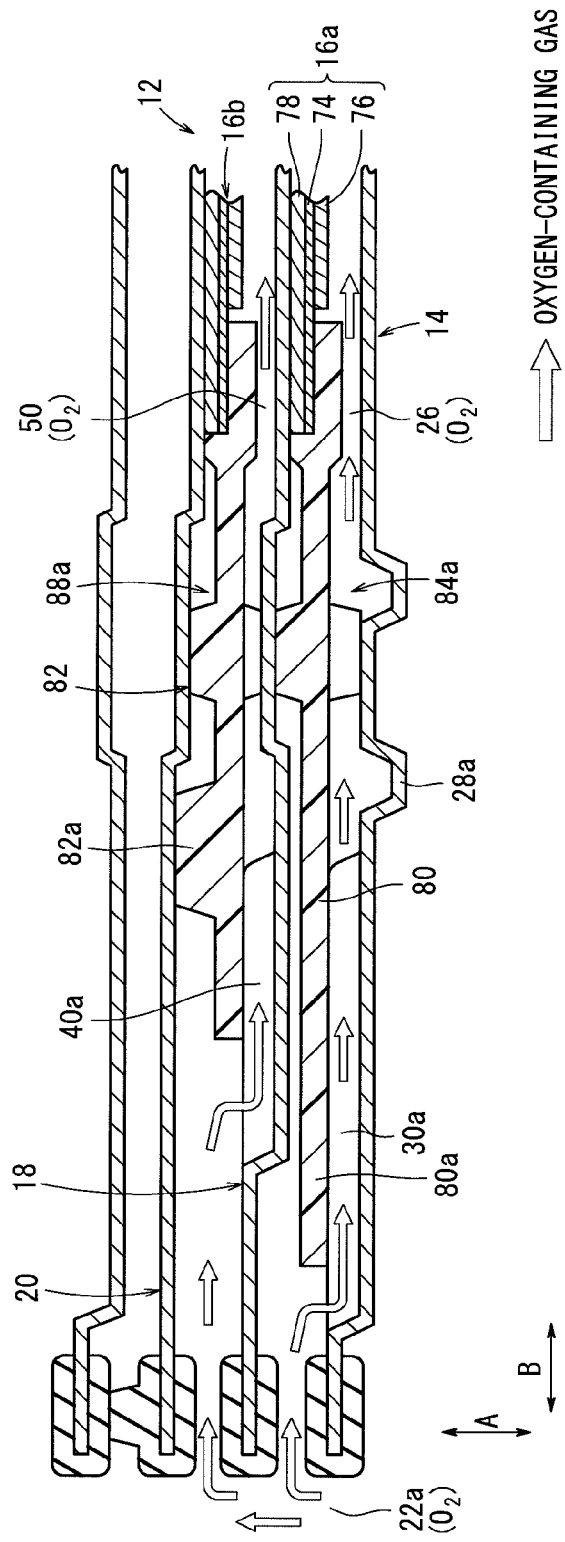
FIG. 4 is a cross sectional view showing the power generation unit, taken along a line IV-IV in FIG. 1.

Thus, as shown in FIG. 4, the oxygen-containing gas from the oxygen-containing gas supply passage 22a flows through the inlet buffer 84a, and the oxygen-containing gas is supplied to the first oxygen-containing gas flow field 26 of the first metal separator 14. Further, the oxygen-containing gas from the oxygen-containing gas supply passage 22a flows through the inlet buffer 88a, and the oxygen-containing gas is supplied to the second oxygen-containing gas flow field 50 of the second metal separator 18.

As shown in FIGS. 1, 5, and 8, the oxygen-containing gas flows along the first oxygen-containing gas flow field 26 in the horizontal direction indicated by the arrow B, and the oxygen-containing gas is supplied to the cathode 76 of the first membrane electrode assembly 16a. Further, the oxygen-containing gas flows along the second oxygen-containing gas flow field 50 in the direction indicated by the arrow B, and the oxygen-containing gas is supplied to the cathode 76 of the second membrane electrode assembly 16b.

In the meanwhile, as shown in FIG. 3, the fuel gas from the fuel gas supply passage 24a flows through the supply holes 42a, and the fuel gas is supplied to the inlet buffer 86a. Then, the fuel gas flows through the inlet buffer 86a, and the fuel gas is supplied to the first fuel gas flow field 40 of the second metal separator 18. Further, the fuel gas from the fuel gas supply passage 24a flows through the supply holes 60a, and the fuel gas is supplied to the inlet buffer 90a. Then, the fuel gas flows through the inlet buffer 90a, and the fuel gas is supplied to the second fuel gas flow field 58 of the third metal separator 20.

As shown in FIGS. 1, 7, and 9, the fuel gas flows along the first fuel gas flow field 40 in the direction indicated by the arrow B, and the fuel gas is supplied to the anode 78 of the first membrane electrode assembly 16a. Further, the fuel gas flows along the second fuel gas flow field 58 in the direction indicated by the arrow B, and the fuel gas is supplied to the anode 78 of the second membrane electrode assembly 16b.

Thus, in each of the first membrane electrode assembly 16a and the second membrane electrode assembly 16b, the oxygen-containing gas supplied to each cathode 76 and the fuel gas supplied to each anode 78 are partially consumed in electrochemical reactions at catalyst layers of the cathode 76 and the anode 78 for generating electricity.

Then, the oxygen-containing gas partially consumed at each of the cathodes 76 of the first membrane electrode assembly 16a and the second membrane electrode assembly 16b is discharged from the outlet buffers 84b, 88b into the oxygen-containing gas discharge passage 22b (see FIG. 1).

The fuel gas partially consumed at each of the anodes 78 of the first membrane electrode assembly 16a and the second membrane electrode assembly 16b is discharged from the outlet buffers 86b, 90b through the discharge holes 42b, 60b into the fuel gas discharge passage 24b.

As shown in FIG. 1, the coolant supplied to the pair of upper and lower coolant supply passages 25a is supplied from each of the coolant supply passages 25a to the coolant flow field 38. The coolant temporarily flows inward in the direction indicated by the arrow C, and then, the coolant moves in the direction indicated by the arrow B to cool the first membrane electrode assembly 16a and the second membrane electrode assembly 16b. After the coolant moves outward in the direction indicated by the arrow C, the coolant is discharged into the pair of the coolant discharge passages 25b.

As described above, during power generation in each of the power generation units 12 of the fuel cell 10, water is produced in the first oxygen-containing gas flow field 26 and the second oxygen-containing gas flow field 50 by power generation reaction. For example, the first oxygen-containing gas flow field 26 is elongated in a horizontal direction. The water produced in power generation reaction moves downward in the direction of gravity from a middle of the first oxygen-containing gas flow field 26, and tends to be retained on the power generation surface at a lower position in the direction of gravity.

In the first embodiment, as shown in FIGS. 2 and 5, on the surface 14a of the first metal separator 14, the first cathode water discharge channel 32 is provided at the lower end of the first oxygen-containing gas flow field 26 in the direction of gravity for discharging the water produced in the power generation reaction downward in the direction of gravity.

In the structure, after the water produced in the power generation reaction moves to the lower end of the first oxygen-containing gas flow field 26, the water flows through the first cathode water discharge channel 32 to the water discharge flow field 36, moves along the water discharge flow field 36 in the direction indicated by the arrow B, and then, the water is discharged into the oxygen-containing gas discharge passage 22b.

Further, the first cathode water discharge channel 32 is formed by the corrugated sections 34a, 34b including protrusions and recesses formed alternately and integrally on the surface 14a of the first metal separator 14 and the surface 14b opposite to the surface 14a by press forming.

Thus, in the first oxygen-containing gas flow field 26, though the water produced in the power generation reaction tends to be retained in the electrode surface at a lower position in the direction of gravity, with the simple structure, it becomes possible to discharge the water from the electrode surface easily and reliably. Therefore, in the fuel cell 10, the optimum power generation environment can be maintained suitably. Further, in the second oxygen-containing gas flow field 50, the same advantages as in the case of the first oxygen-containing gas flow field 26 are obtained.

Further, the water produced in the power generation reaction, and diffused backward from the first oxygen-containing gas flow field 26 and the second oxygen-containing gas flow field 50 through the solid polymer electrolyte membrane 74 is present in the first fuel gas flow field 40 and the second fuel gas flow field 58. The water moves downward in the direction of gravity from a middle of the first fuel gas flow field 40 and the second fuel gas flow field 58, and tends to be retained on the power generation surface at a lower position in the direction of gravity.

In this regard, as shown in FIGS. 2 and 7, the first anode water discharge channel 44 is provided at the lower end of the first fuel gas flow field 40 in the direction of gravity, for discharging the water produced in the power generation reaction from the first fuel gas flow field 40 downward in the direction of gravity.

In the structure, after the water produced in the power generation moves to the lower end of the first fuel gas flow field 40, the water moves through the first anode water discharge channel 44 to the water discharge flow field 48, and then, moves along the water discharge flow field 48 in the direction indicated by the arrow B, and the water is discharged into the fuel gas discharge passage 24*b*.

Further, the first anode water discharge channel 44 is formed by the corrugated sections 46*a*, 46*b* including protrusions and recesses formed alternately and integrally on the surface 18*a* of the second metal separator 18 and the surface 18*b* opposite to the surface 18*a* by press forming.

Thus, in the first fuel gas flow field 40, though the water produced in the power generation reaction tends to be retained in the electrode surface at a lower position in the direction of gravity, with the simple structure, it becomes possible to discharge the water easily and reliably from the electrode surface. Therefore, in the fuel cell 10, the optimum power generation environment can be maintained suitably. Further, in the second fuel gas flow field 58, the same advantages as in the case of the first fuel gas flow field 40 are obtained.

Figure 15:
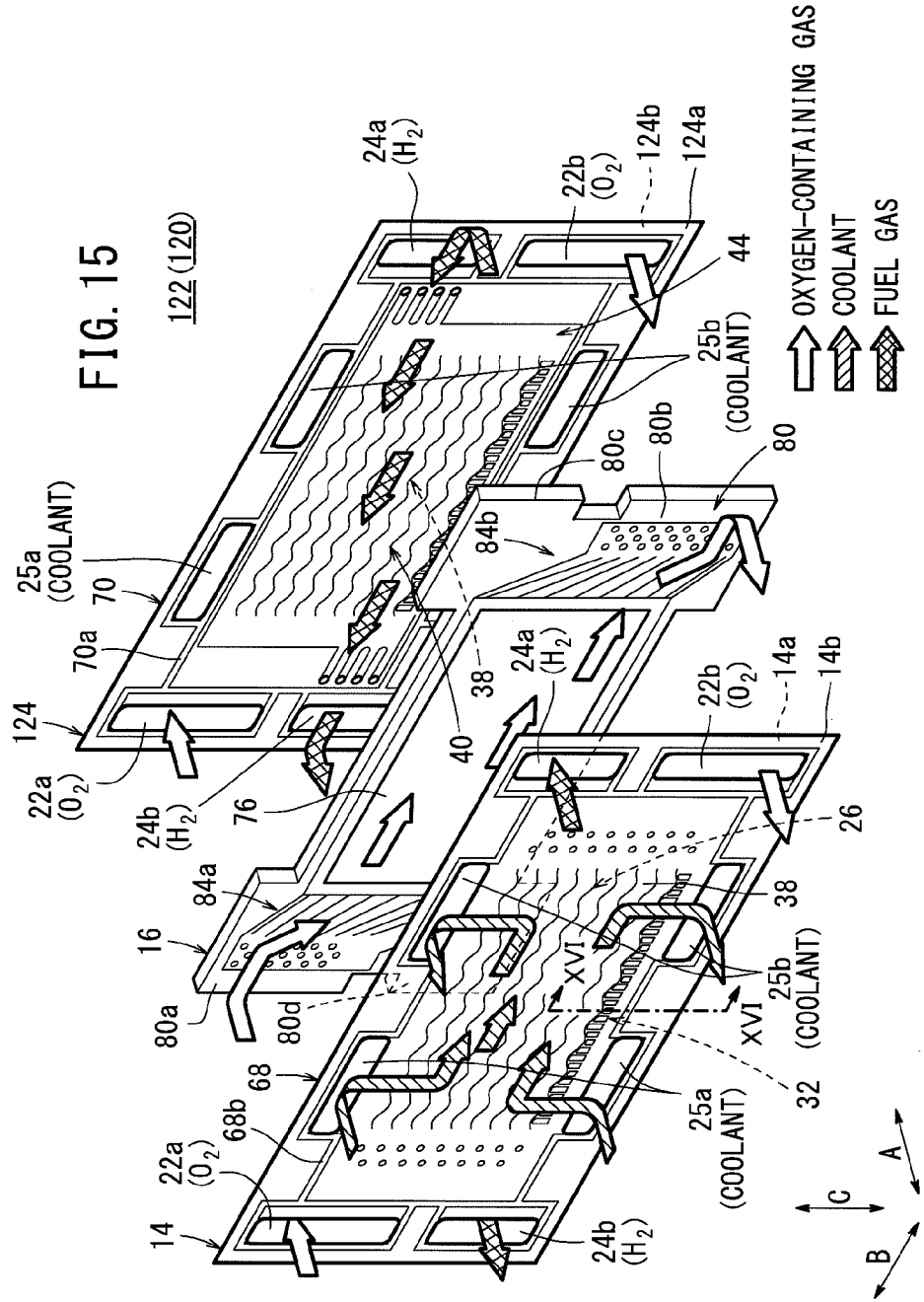
FIG. 15 is an exploded perspective view showing main components of a power generation unit of a fuel cell according to a second embodiment of the present invention.
Figure 16:
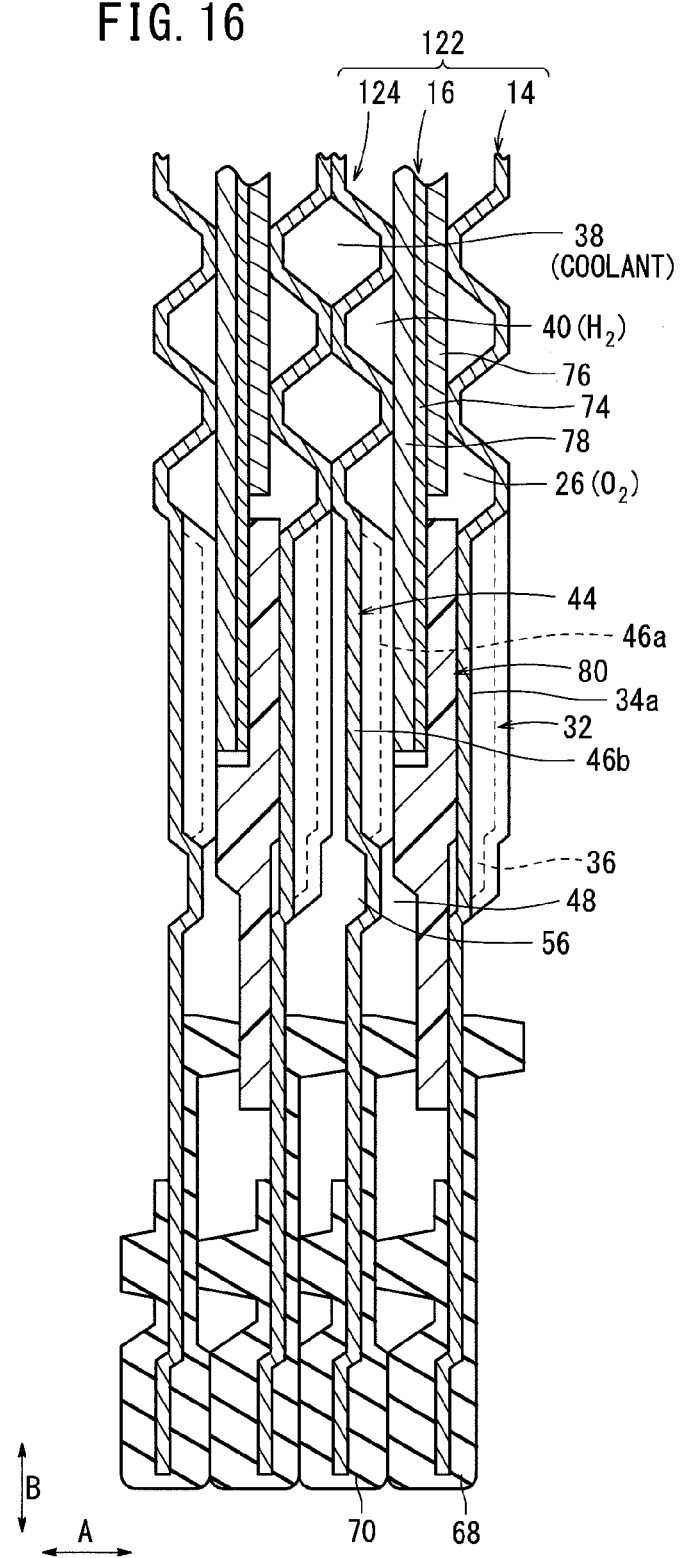
FIG. 16 is a cross sectional view showing the power generation unit, taken along a line XVI-XVI in FIG. 15.

As shown in FIGS. 15 and 16, a fuel cell 120 according to a second embodiment of the present invention is formed by stacking a plurality of power generation units 122 together.

The power generation unit 122 includes a membrane electrode assembly 16 and a first metal separator 14 and a second metal separator 124 sandwiching the membrane electrode assembly 16. The constituent elements that are identical to those of the fuel cell 10 according to the first embodiment are labeled with the same reference numerals, and detailed descriptions thereof will be omitted.

The second metal separator 124 has a fuel gas flow field 40 on its surface 124*a* facing the membrane electrode assembly 16, and an anode water discharge channel 44 is provided at a lower end of the fuel gas flow field 40 in the direction of gravity, for discharging water (backwardly diffused water) produced in power generation downward in the direction of gravity from the fuel gas flow field 40. The coolant flow field 38 is partially formed on another surface 124*b* of the second metal separator 124.

The membrane electrode assembly 16 has the same structure as the first membrane electrode assembly 16*a* or the second membrane electrode assembly 16*b* according to the first embodiment.

In the second embodiment, the anode water discharge channel 44 is provided at the lower end of the fuel gas flow field 40 in the direction of gravity. In the structure, the same advantages as in the case of the first embodiment are obtained. For example, though the water produced in power generation reaction tends to be retained on the power generation surface at a lower position in the direction of gravity, it becomes possible to discharge the water from the power generation surface easily and reliably.

Figure 17:
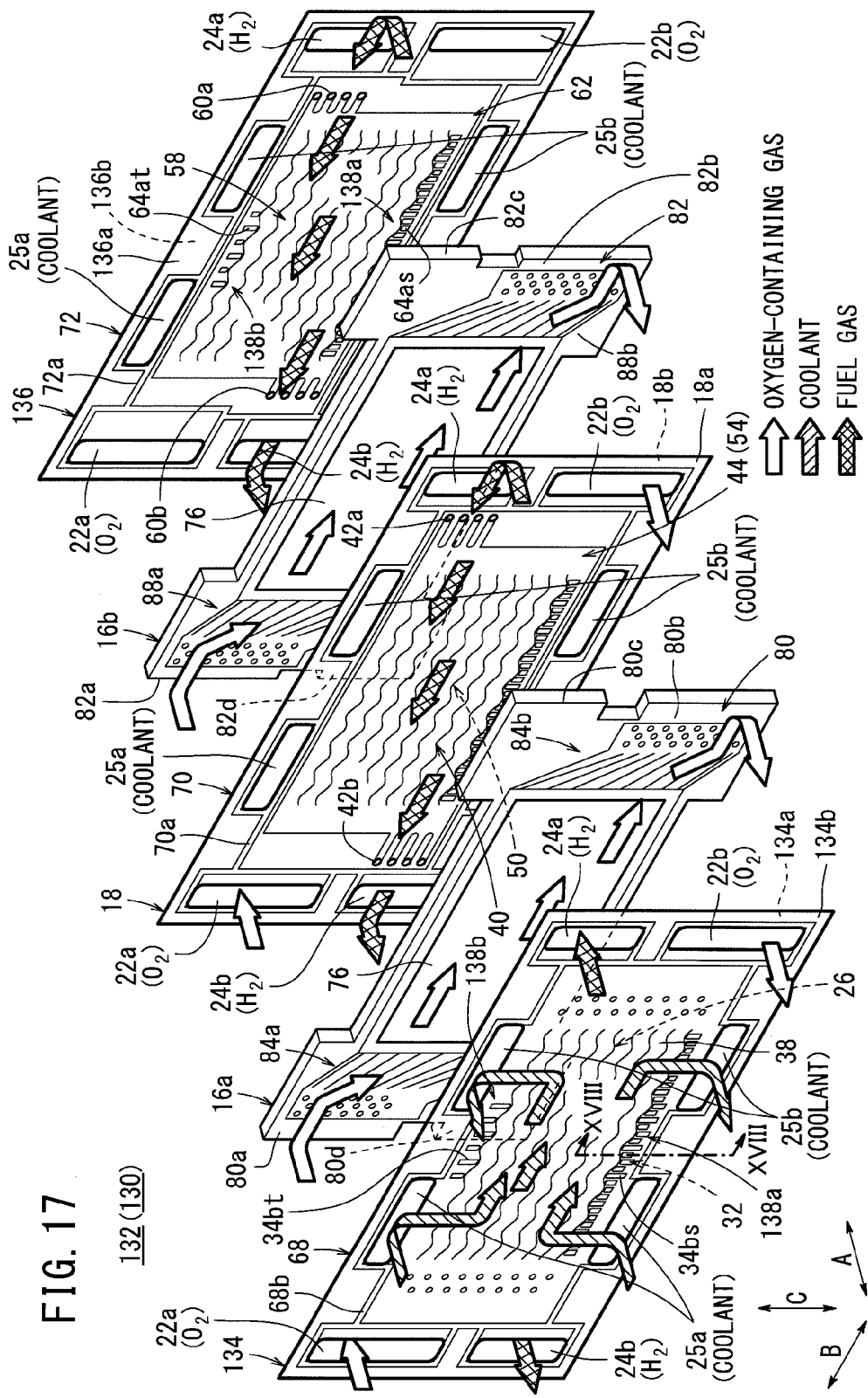
FIG. 17 is an exploded perspective view showing main components of a power generation unit of a fuel cell according to a third embodiment of the present invention.
Figure 18:
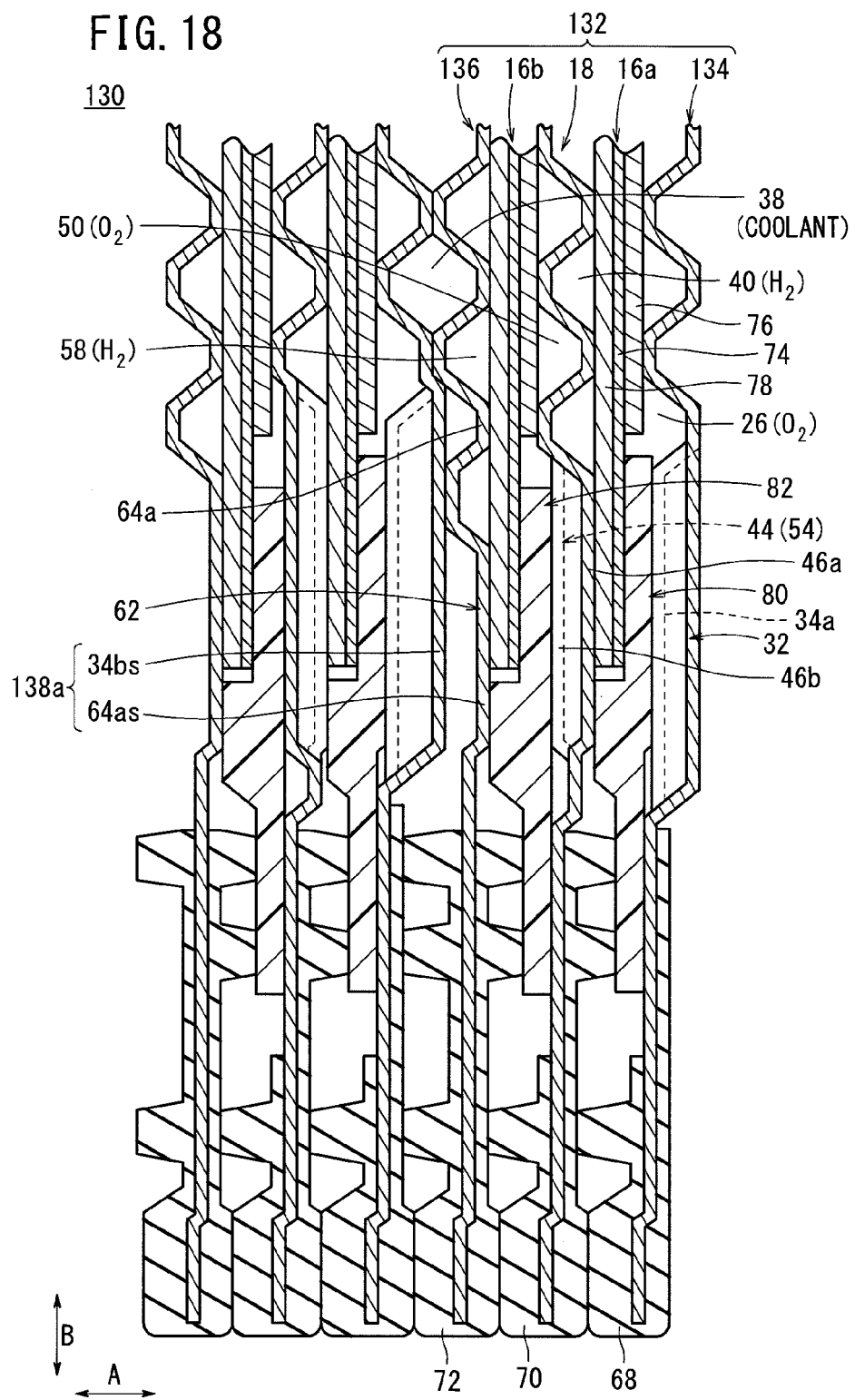
FIG. 18 is a cross sectional view showing the power generation unit, taken along a line XVIII-XVIII in FIG. 17.

As shown in FIGS. 17 and 18, a fuel cell 130 according to a third embodiment of the present invention is formed by stacking a plurality of power generation units 132 together.

The power generation unit 132 includes a first metal separator 134, a first membrane electrode assembly 16*a*, a second metal separator 18, a second membrane electrode assembly 16*b*, and a third metal separator 136.

As shown in FIGS. 17, 18, 19, and 20, bypass limiting sections 138*a*, 138*b* are provided at a lower portion and an upper portion of the first metal separator 134 for preventing the coolant from flowing around the coolant flow field 38, bypassing the coolant flow field 38.

Figure 20:
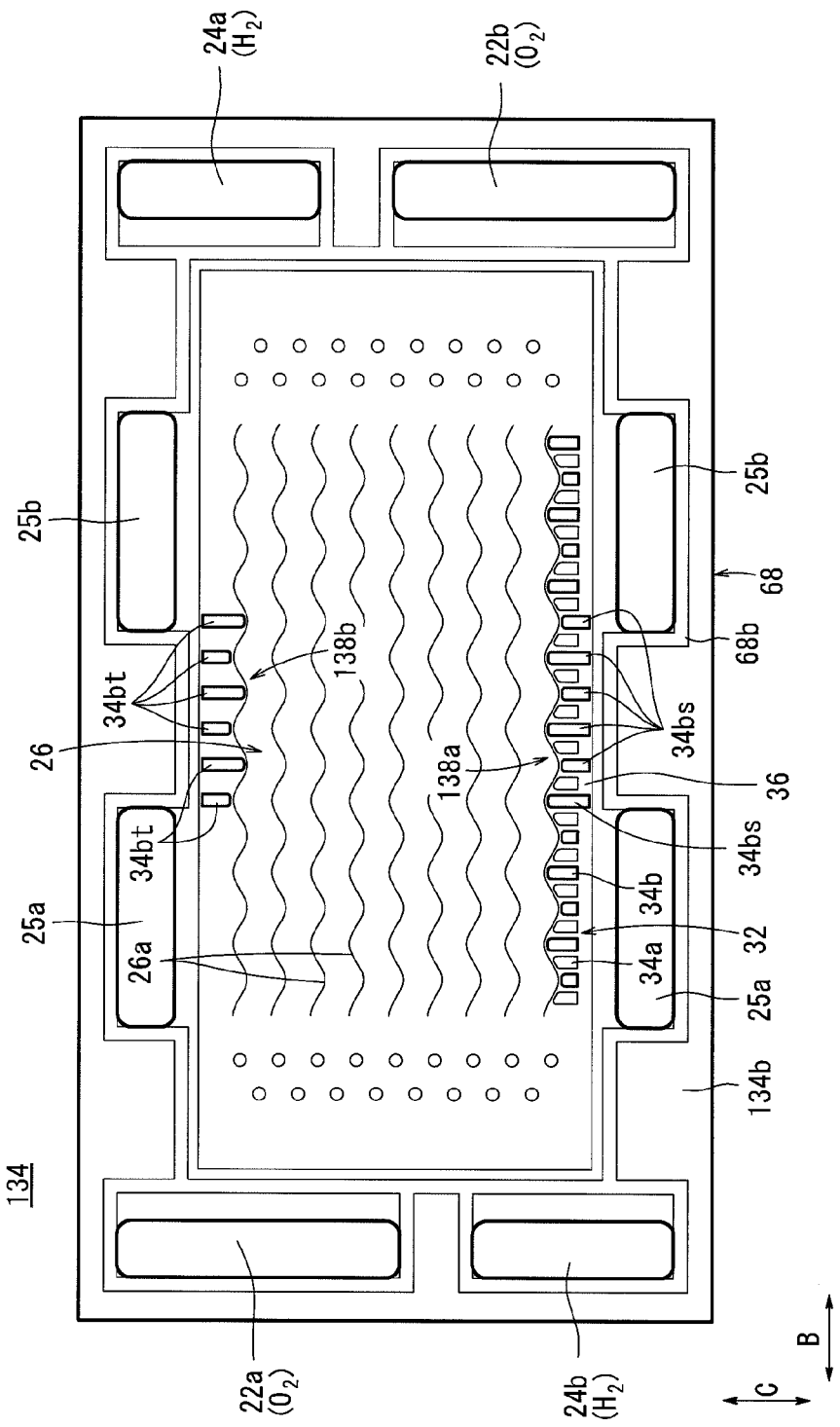
FIG. 20 is a view showing the other surface of the first metal separator.

As shown in FIG. 20, the bypass limiting section 138*a* includes a corrugated section (protrusions) 34*bs* formed between the coolant supply passage 25*a* and the coolant discharge passage 25*b* at the lower positions. The corrugated section 34*bs* is expanded to a greater extent toward the water discharge flow field 36 in comparison with the other corrugated section 34*b*, and provided closely to (including the case where the corrugated section 34*bs* is in contact with: hereinafter the meaning of the expression "closely to" also includes the meaning of "in contact with") a corrugated section 64*as* of the adjacent third metal separator 136 (see FIG. 18) described later. Protrusions of the corrugated section 34*bs* and the corrugated section 64*as* that are provided closely to each other side by side have different lengths in the direction indicated by the arrow C.

The corrugated section 34*bs* is formed by providing two types of protrusions (corresponding to peaks and valleys of the wavy flow grooves 26*a*) having different lengths in a direction intersecting with the flow direction (the direction indicated by the arrow C) of the coolant flow field 38. If the straight flow grooves are adopted instead of the wavy flow grooves 26*a*, the corrugated sections 34*bs* may have a constant length.

At least one protrusion of the corrugated section 34*bs* may be provided adjacent to the end of the coolant supply passage 25*a* near the coolant discharge passage 25*b*, and at least one protrusion of the corrugated section 34*bs* may be provided adjacent to the end of the coolant discharge passage 25*b* near the coolant supply passage 25*a*. The corrugated sections described later may have the same structure.

Figure 19:
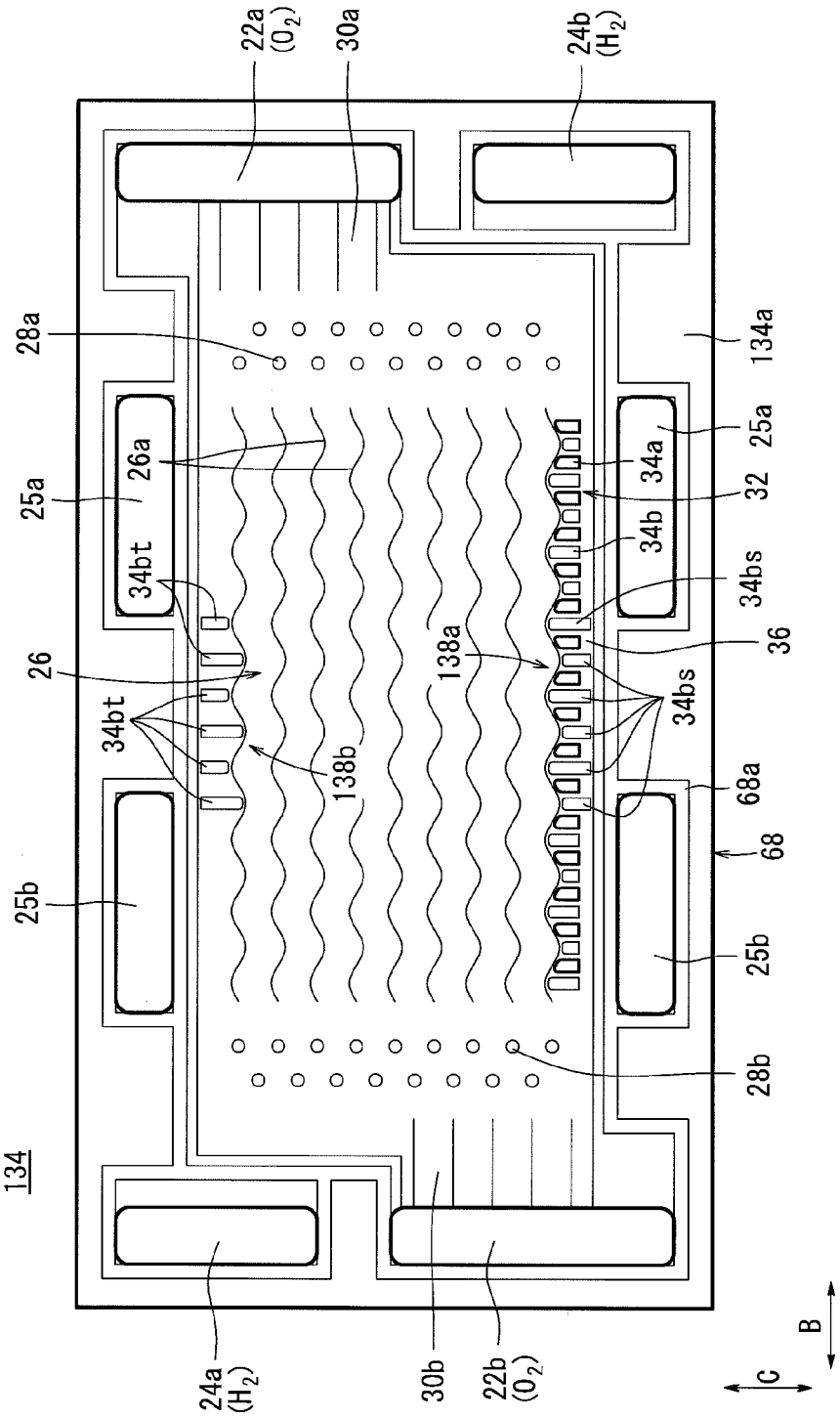
FIG. 19 is a view showing one surface of a first metal separator of the power generation unit.

As shown in FIGS. 17 and 19, the bypass limiting section 138*b* includes a corrugated section (protrusions) 34*bt* formed between the coolant supply passage 25*a* and the coolant discharge passage 25*b* at the upper positions. The corrugated section 34*bt* is formed corresponding to peaks and valleys of a wavy flow groove 26*a* at the uppermost position in the direction of gravity, expanded toward the coolant flow field 38 to a greater extent, and provided closely to a corrugated section 64*at* of the third metal separator 136 described later.

Figure 21:
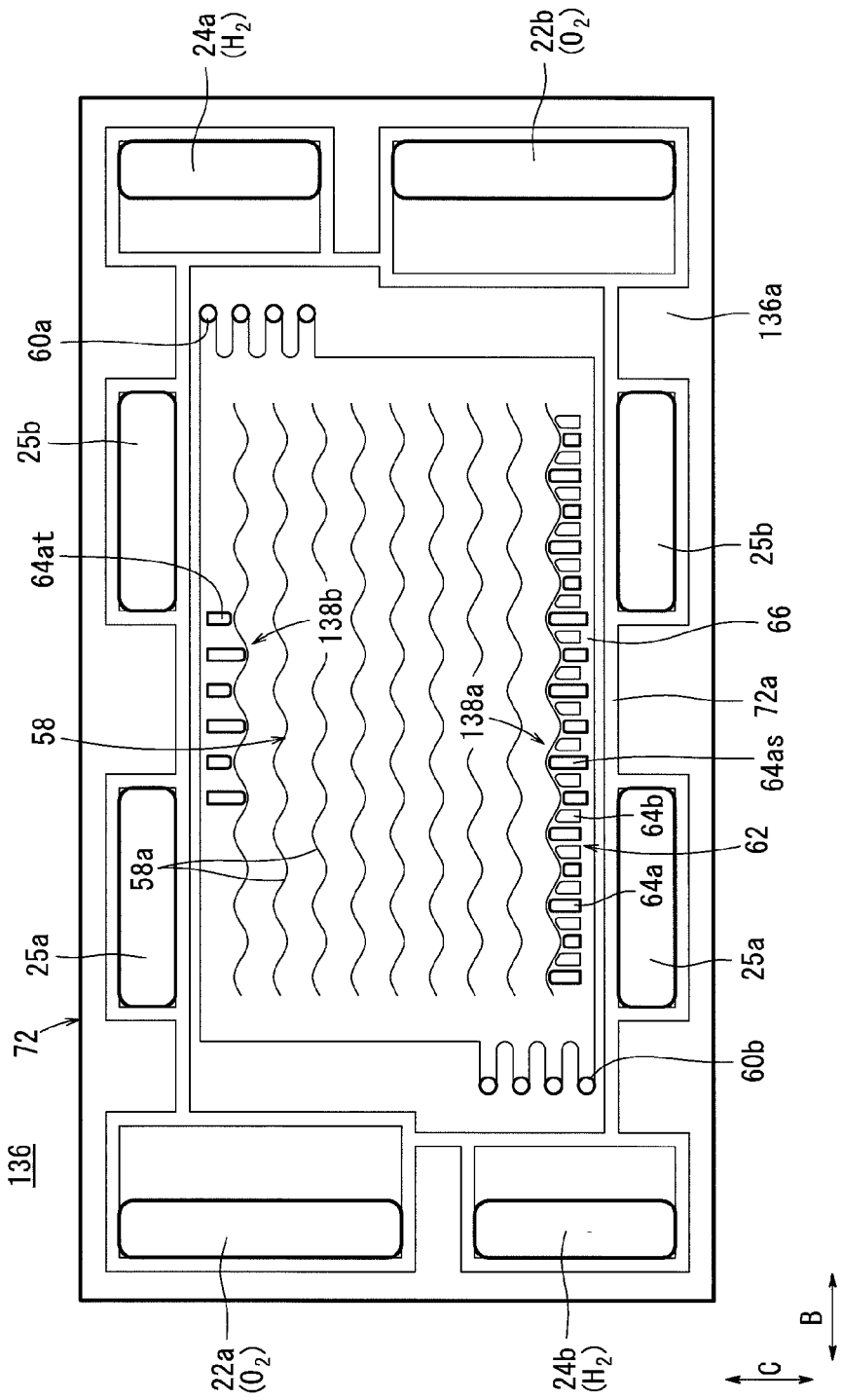
FIG. 21 is a view showing one surface of a third metal separator of the power generation unit.
Figure 22:
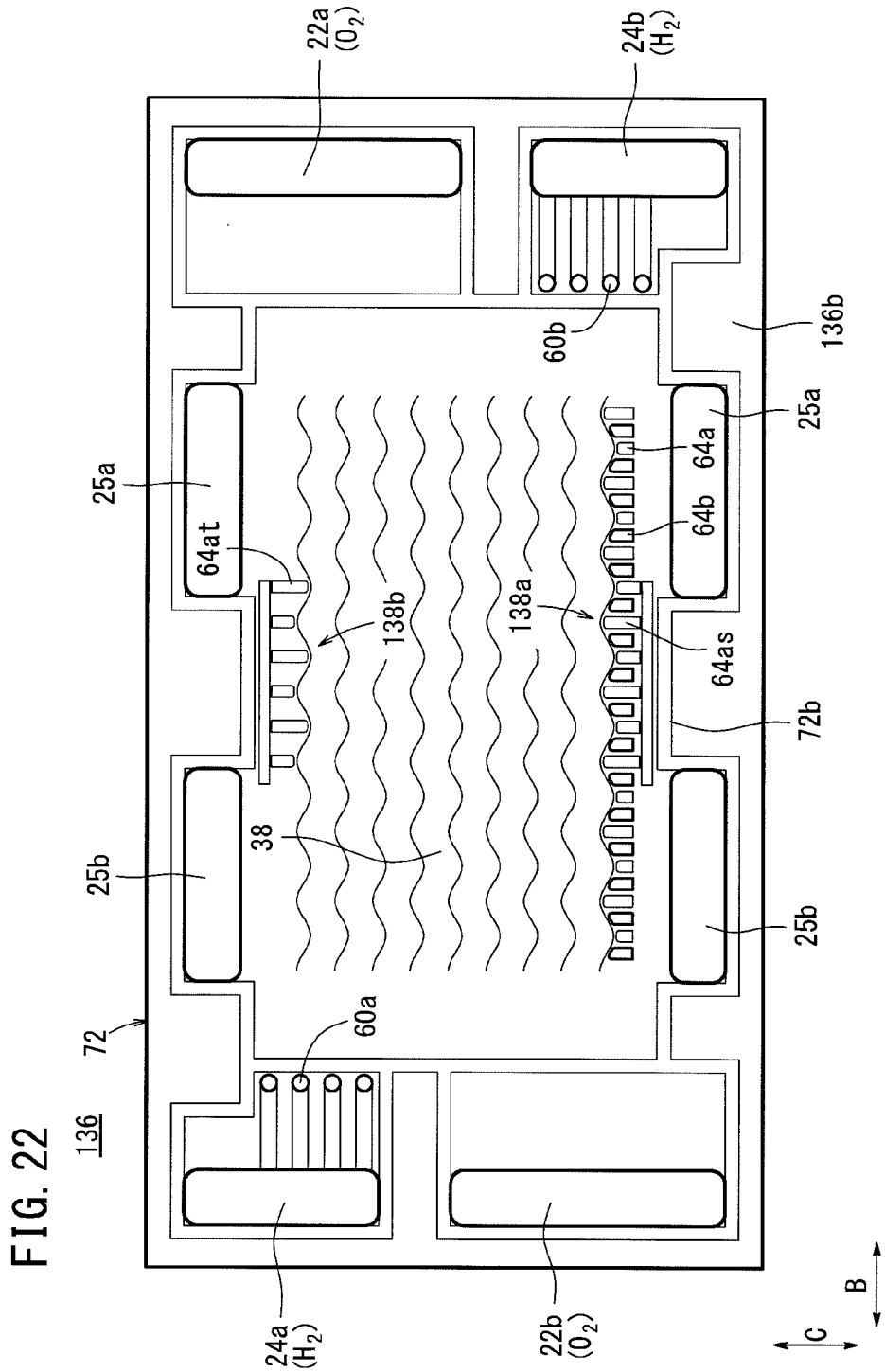
FIG. 22 is a view showing the other surface of the third metal separator.

As shown in FIGS. 21 and 22, in the third metal separator 136, the corrugated section 64*as* which contacts the corrugated section 34*bs* is provided between the coolant supply passage 25*a* and the coolant discharge passage 25*b* at the lower positions. As with the corrugated section 34*bs*, the corrugated section 64*as* is formed by providing two types of protrusions having different lengths alternately. If the straight flow grooves are adopted, however, the corrugated section 64*as* may be formed by protrusions having a constant length. The corrugated section 64*at* which contacts the corrugated section 34*bt* is provided between the coolant supply passage 25*a* and the coolant discharge passage 25*b* at the upper positions.

The corrugated section 64*at* at the upper position may be provided as necessary. For example, a flat surface may be formed instead of the corrugated section 64*at* as long as it contacts the corrugated section 34*bt* to form the bypass limiting section 138*b*.

In the third embodiment, as shown in FIGS. 17, 18, 19, and 20, the bypass limiting sections 138a, 138b are provided at upper and lower positions of the first metal separator 134 for preventing the coolant from bypassing the coolant flow field 38 to flow around the coolant flow field 38.

The bypass limiting section 138a includes at least one protrusion of the corrugated section 34bs provided in the first metal separator 134 between the coolant supply passage 25a and the coolant discharge passage 25b, and at least one protrusion of the corrugated section 64as provided in the third metal separator 136 adjacent to the first metal separator 134 to contact the corrugates section 34bs (see FIG. 18).

Likewise, the bypass limiting section 138b includes at least one protrusion of the corrugated section 34bt provided in the first metal separator 134, and at least one protrusion of the corrugated section 64at provided in the third metal separator 136 adjacent to the first metal separator 134 to contact the corrugated section 34bt (see FIGS. 17, and 19 to 22).

Thus, the coolant supplied from the coolant supply passage 25a to the coolant flow field 38 does not bypass the coolant flow field 38. After the coolant flows through the coolant flow field 38 reliably, the coolant is discharged into the coolant discharge passage 25b.

At this time, the bypass limiting sections 138a, 138b can be provided by press forming the first metal separator 134 and the third metal separator 136 themselves to form protrusions integrally with the first metal separator 134 and the third metal separator 136. Therefore, the protrusions can suitably block the bypassing path formed around the coolant flow field 38. With the simple and economical structure, shortcuts of the coolant can be prevented as much as possible.

Figure 23:
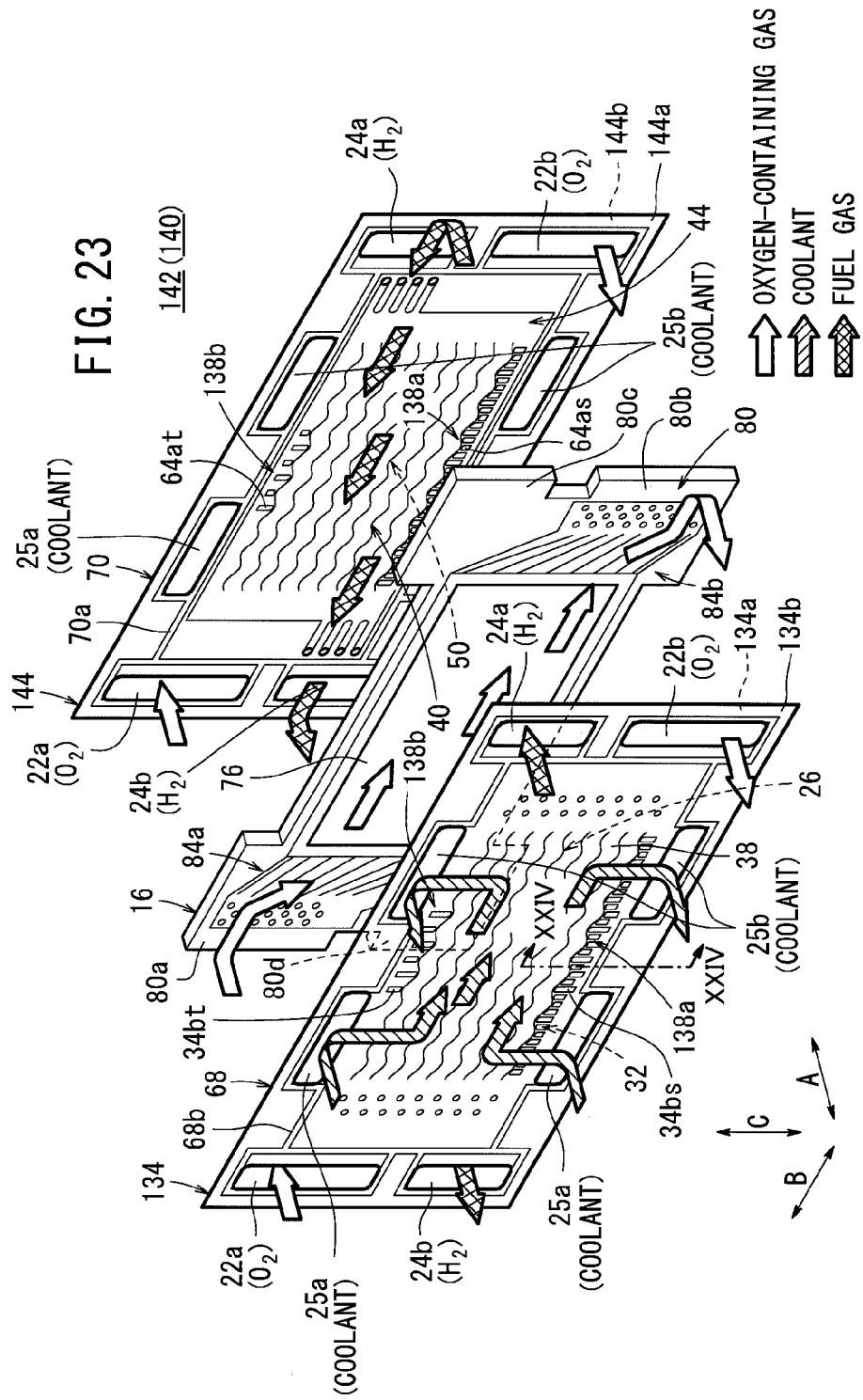
FIG. 23 is an exploded perspective view showing main components of a power generation unit of a fuel cell according to a fourth embodiment of the present invention.
Figure 24:
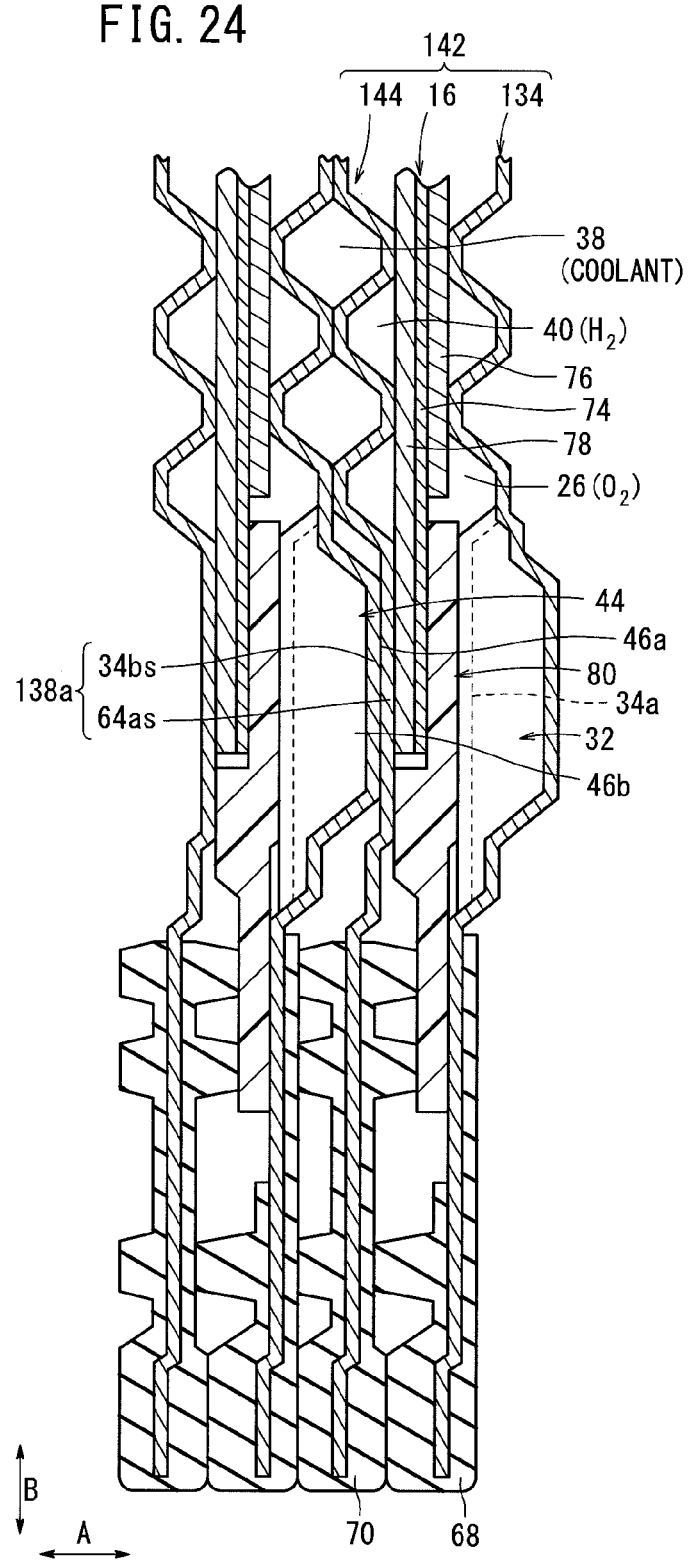
FIG. 24 is a cross sectional view showing the power generation unit, taken along a line XXIV-XXIV in FIG. 23.
Figure 25:
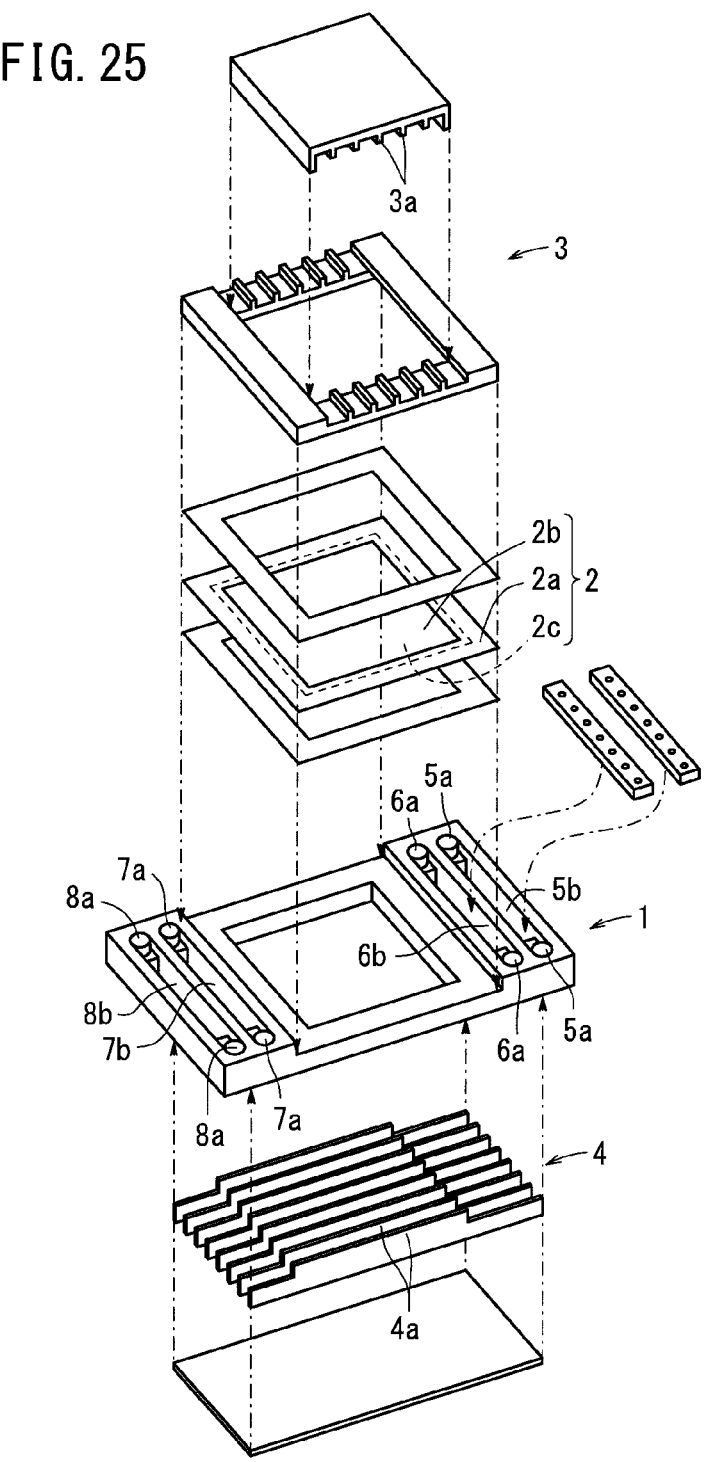
FIG. 25 is an exploded perspective view showing a fuel cell disclosed in the conventional technique 1.

As shown in FIGS. 23 and 24, a fuel cell 140 according to a fourth embodiment of the present invention is formed by stacking a plurality of power generation units 142 together.

The power generation unit 142 includes a membrane electrode assembly 16 and a first metal separator 134 and a second metal separator 144 sandwiching the membrane electrode assembly 16. The constituent elements that are identical to those of the fuel cell 130 according to the third embodiment are labeled with the same reference numerals, and detailed descriptions thereof will be omitted.

The second metal separator 144 includes a fuel gas flow field 40 on its surface 144a facing the membrane electrode assembly 16. A corrugated section 64as and a corrugated section 64at protruding on both of front and back surfaces of the second metal separator 144 are provided to contact the corrugated section 34bs and the corrugated section 34bt, respectively.

The corrugated section 64as contacts the corrugated section 34bs to form the bypass limiting section 138a, and the corrugated section 64at contacts the corrugated section 34bt to form the bypass limiting section 138b.

The membrane electrode assembly 16 has the same structure as the first membrane electrode assembly 16a or the second membrane electrode assembly 16b according to the first embodiment.

In the fourth embodiment, the first metal separator 134 is stacked with the second metal separator 144 to form the bypass limiting sections 138a, 138b. Thus, with the simple and economical structure, the same advantages as in the case of the third embodiment are obtained. For example, shortcuts of the coolant can be prevented as much as possible.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell formed by stacking a membrane electrode assembly and a metal separator together horizontally in a stacking direction, the membrane electrode assembly includes a pair of electrodes and an electrolyte membrane interposed between the electrodes, the electrodes each having an electrode surface provided vertically along a direction of gravity, the electrode surface having a shape elongated in a horizontal direction which is orthogonal to the stacking direction of the metal separator, a reactant gas flow field being provided in the electrode surface for allowing an oxygen-containing gas or a fuel gas as a reactant gas to flow along the electrode surface in a longitudinal direction thereof;
wherein a water discharge channel is provided at a lower end of the reactant gas flow field in the direction of gravity for discharging water produced in power generation reaction downward in the direction of gravity; and
the water discharge channel is formed by a corrugated section including a protrusion and a recess formed alternately on a surface of the metal separator where the reactant gas flow field is provided, the water discharge passage extending on the surface in a direction which intersects the longitudinal direction in which the reactant gas flow field extends.

2. The fuel cell according to claim 1, wherein a resin frame member is provided around the membrane electrode assembly;
the water discharge flow field is formed between the resin frame member and the metal separator.

3. The fuel cell according to claim 1, wherein:
a reactant gas inlet is provided on a first side of the metal separator;
a reactant gas outlet is provided on a second side of the metal separator, the second side being opposite the first side in the longitudinal direction; and
a water discharge outlet connected to the water discharge channel is provided on a third side of the separator distinct from the first side and the second side, the third side of the separator being located at a bottom of the separator in the gravitational direction.

4. The fuel cell according to claim 1, wherein the reactant gas flow field comprises a plurality of flow grooves having a wave shape, and a length of the corrugated section changes cyclically in correspondence with the wave shape of a bottom-most flow groove in the reactant gas flow field.

5. A fuel cell formed by stacking a membrane electrode assembly and a metal separator together horizontally in a stacking direction, the membrane electrode assembly includes a pair of electrodes and an electrolyte membrane interposed between the electrodes, the electrodes each having an electrode surface provided vertically along a direction of gravity, the electrode surface having a shape elongated in a horizontal direction which is orthogonal to the stacking direction of the metal separator, a reactant gas flow field being provided in the electrode surface for allowing an oxygen-containing gas or a fuel gas as a reactant gas to flow along the electrode surface in a longitudinal thereof;
wherein a water discharge channel is provided at a lower end of the reactant gas flow field in the direction of gravity for discharging water produced in power generation reaction downward in the direction of gravity;
the water discharge channel is formed by a corrugated section including a protrusion and a recess formed alternately on a surface where the reactant gas flow field is provided;
wherein a reactant gas discharge passage is provided at a lower position at one end of the metal separator in the longitudinal direction, the reactant gas discharge passage being connected to the reactant gas flow field and extending in the stacking direction, a water discharge flow field is connected to a lower position of the corrugated section; and the water discharge flow field extends in the longitudinal direction of the metal separator, and the water discharge flow field is connected to the reactant gas discharge passage.

* * * * *

UNITED STATES PATENT AND TRADEMARK OFFICE
CERTIFICATE OF CORRECTION

PATENT NO. : 9,088,015 B2
APPLICATION NO. : 13/800625
DATED : July 21, 2015
INVENTOR(S) : Kentaro Ishida et al.

It is certified that error appears in the above-identified patent and that said Letters Patent is hereby corrected as shown below:

Title Page, please insert item (30)

-- Foreign Priority Application Data

JP 2012-070156 filed March 26, 2012
JP 2012-070079 filed March 26, 2012 --

Signed and Sealed this
Fifteenth Day of December, 2015

Michelle K. Lee
*Director of the United States Patent and Trademark Office*